United States Patent
Nelaturi et al.

(10) Patent No.: US 12,443,772 B1
(45) Date of Patent: Oct. 14, 2025

(54) METHOD FOR AUTOMATICALLY GENERATING ASSEMBLY AND DISASSEMBLY PLANS

(71) Applicant: C-INFINITY, INC., Mountain View, CA (US)

(72) Inventors: Saigopal Nelaturi, Mountain View, CA (US); Christian Wilhelm Fritz, Menlo Park, CA (US); Johan de Kleer, Los Altos, CA (US)

(73) Assignee: C-INFINITY, INC., Mountain View, CA (US)

( * ) Notice: Subject to any disclaimer, the term of this patent is extended or adjusted under 35 U.S.C. 154(b) by 0 days.

(21) Appl. No.: 19/176,726

(22) Filed: Apr. 11, 2025

Related U.S. Application Data

(60) Provisional application No. 63/685,661, filed on Aug. 21, 2024, provisional application No. 63/633,465, filed on Apr. 12, 2024.

(51) Int. Cl.
*G06F 30/17* (2020.01)

(52) U.S. Cl.
CPC .................... *G06F 30/17* (2020.01)

(58) Field of Classification Search
CPC ................................ G06F 30/17; G06F 30/00
USPC ........................................................ 703/7, 6
See application file for complete search history.

(56) References Cited

U.S. PATENT DOCUMENTS

| | | | | |
|---|---|---|---|---|
| 9,390,534 | B2 * | 7/2016 | Enomoto | G06T 13/20 |
| 2011/0055700 | A1 * | 3/2011 | Xin | G06F 3/04845 |
| | | | | 700/98 |

FOREIGN PATENT DOCUMENTS

WO  WO-2008095574 A2 *  8/2008  ............. G06F 30/00

OTHER PUBLICATIONS

Popescu, Diana et al., "Disassembly Method Based on Connection Interface and Mobility Operator Concepts", Jun. 26, 2013, Int J Adv Manuf Technol, Springer-Verlag. (Year: 2013).*

(Continued)

*Primary Examiner* — Cedric Johnson
(74) *Attorney, Agent, or Firm* — Run8 Patent Group, LLC; Peter Miller; Marissa Kohrman

(57) ABSTRACT

One variation of a method includes: accessing a virtual assembly; for a virtual component in a set of virtual components within the virtual assembly, generating a constellation of rays emanating from an inset surface of the virtual component; traversing the virtual component along a first ray, in the constellation of rays, in a first direction; in response to the virtual component colliding with another virtual component along the first ray, identifying a restricted escape direction; traversing the virtual component along a second ray, in the constellation of rays, in a second direction; in response to the virtual shell avoiding collision with another virtual component along the second ray, identifying an unrestricted escape direction; and generating a virtual assembly sequence specifying installation of the virtual component, opposite the second direction, prior to installation of another virtual component, based on the unrestricted escape direction.

20 Claims, 9 Drawing Sheets

(56) References Cited

OTHER PUBLICATIONS

Pan, Wanbin et al., "Automatic Disassembly Navigation for Accurate Virtual Assembly Path Planning", 2014, Assembly Automation, Emerald Group Publishing Limited. (Year: 2014).*

Briceno, Jose J. et al., "Automatic Disassembly Plan Generation from CAD Assembly Models", Jul. 22-25, 2007, International Symposium on Assembly and Manufacturing, IEEE. (Year: 2007).*

* cited by examiner

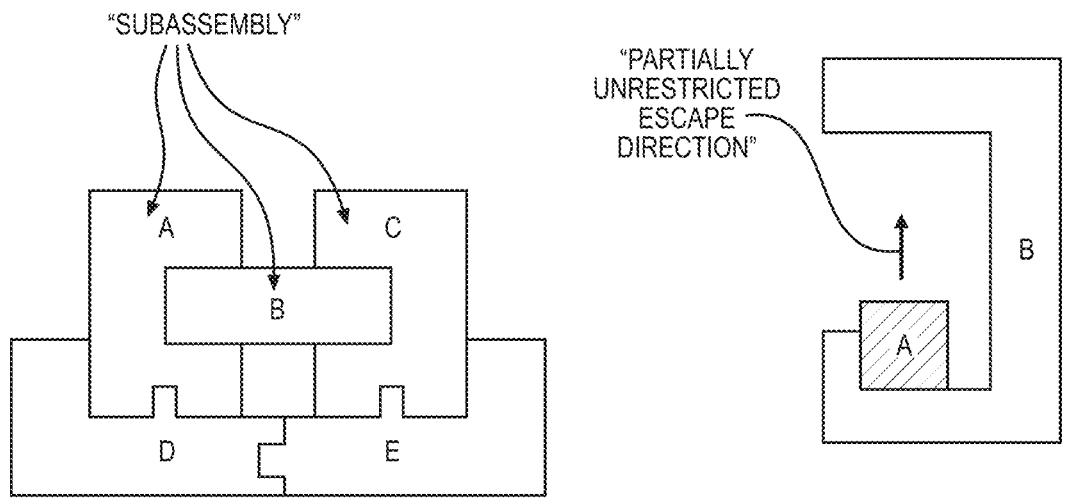
FIGURE 8  FIGURE 9
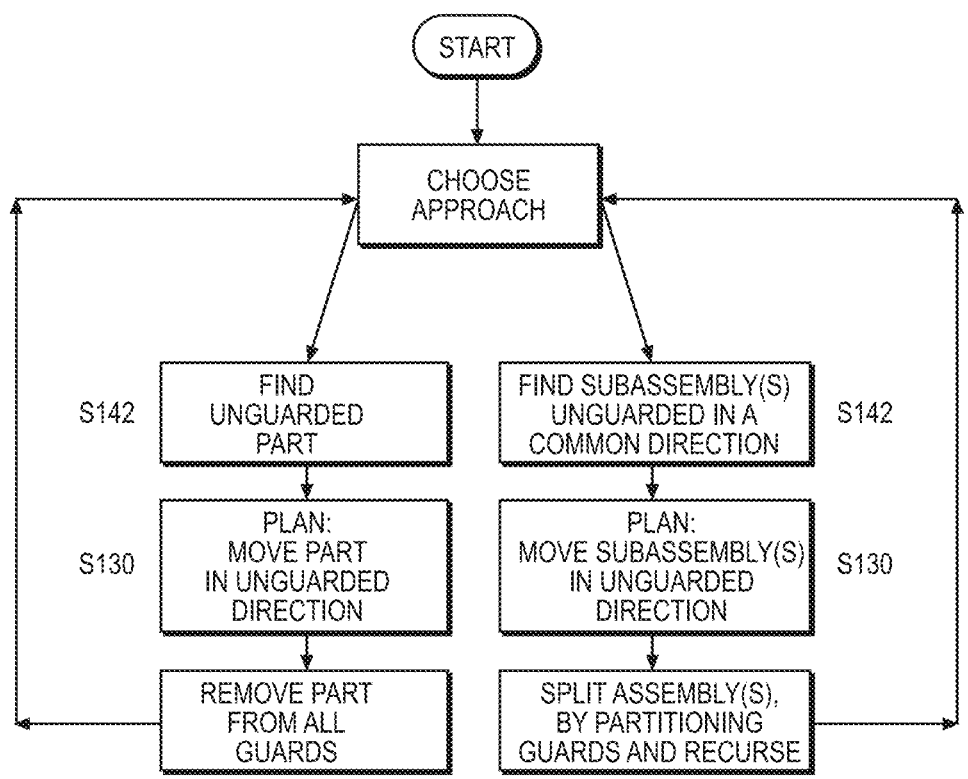
FIGURE 10

METHOD FOR AUTOMATICALLY GENERATING ASSEMBLY AND DISASSEMBLY PLANS

CROSS-REFERENCE TO RELATED APPLICATIONS

This application claims the benefit of U.S. Provisional Application No. 63/685,661, filed on 21 Aug. 2024 and U.S. Provisional Application No. 63/633,465, filed on 12 Apr. 2024, each of which is incorporated in its entirety by this reference.

TECHNICAL FIELD

This invention relates generally to the field of assembly plan automation and, more specifically, to a new and useful method for automatically generating assembly and disassembly plans.

BRIEF DESCRIPTION OF THE FIGURES

FIG. 8 is a flowchart representation of a variation of the method;
FIG. 9 is a flowchart representation of a variation of the method;
FIG. 10 is a flowchart representation of a variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
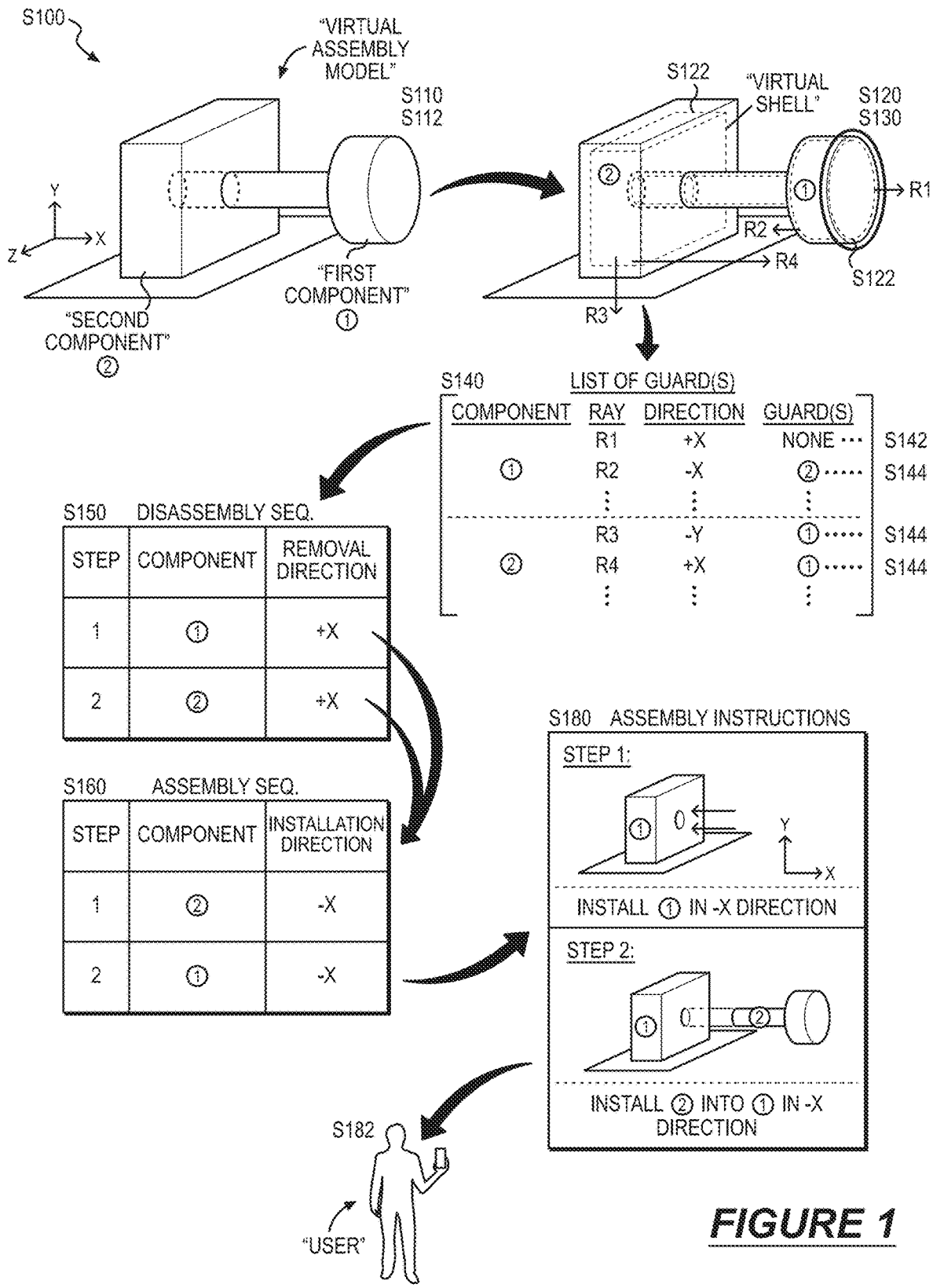
FIG. 1 is a flowchart representation of a method.
Figure 2:
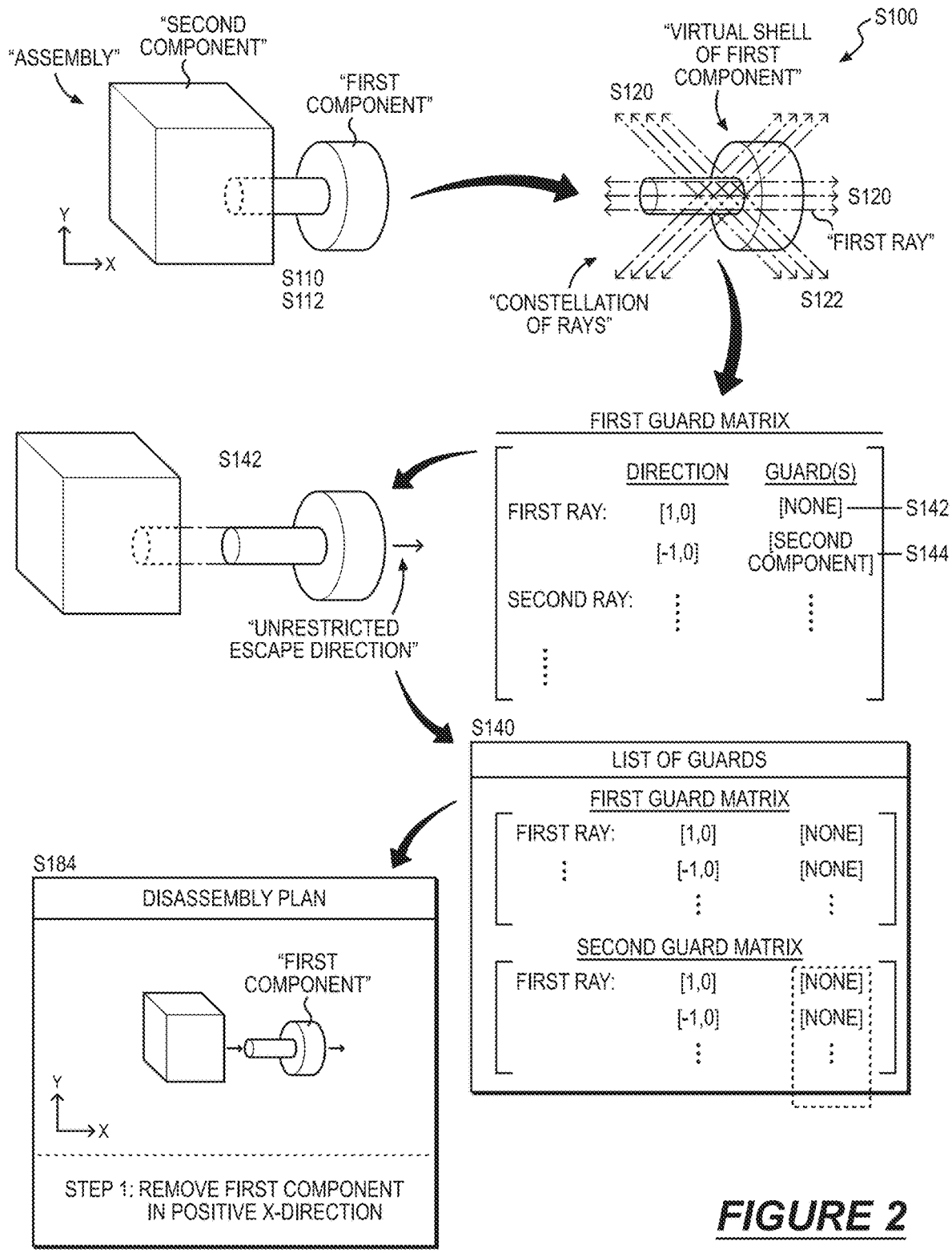
FIG. 2 is a flowchart representation of a variation of the method.
Figure 4:
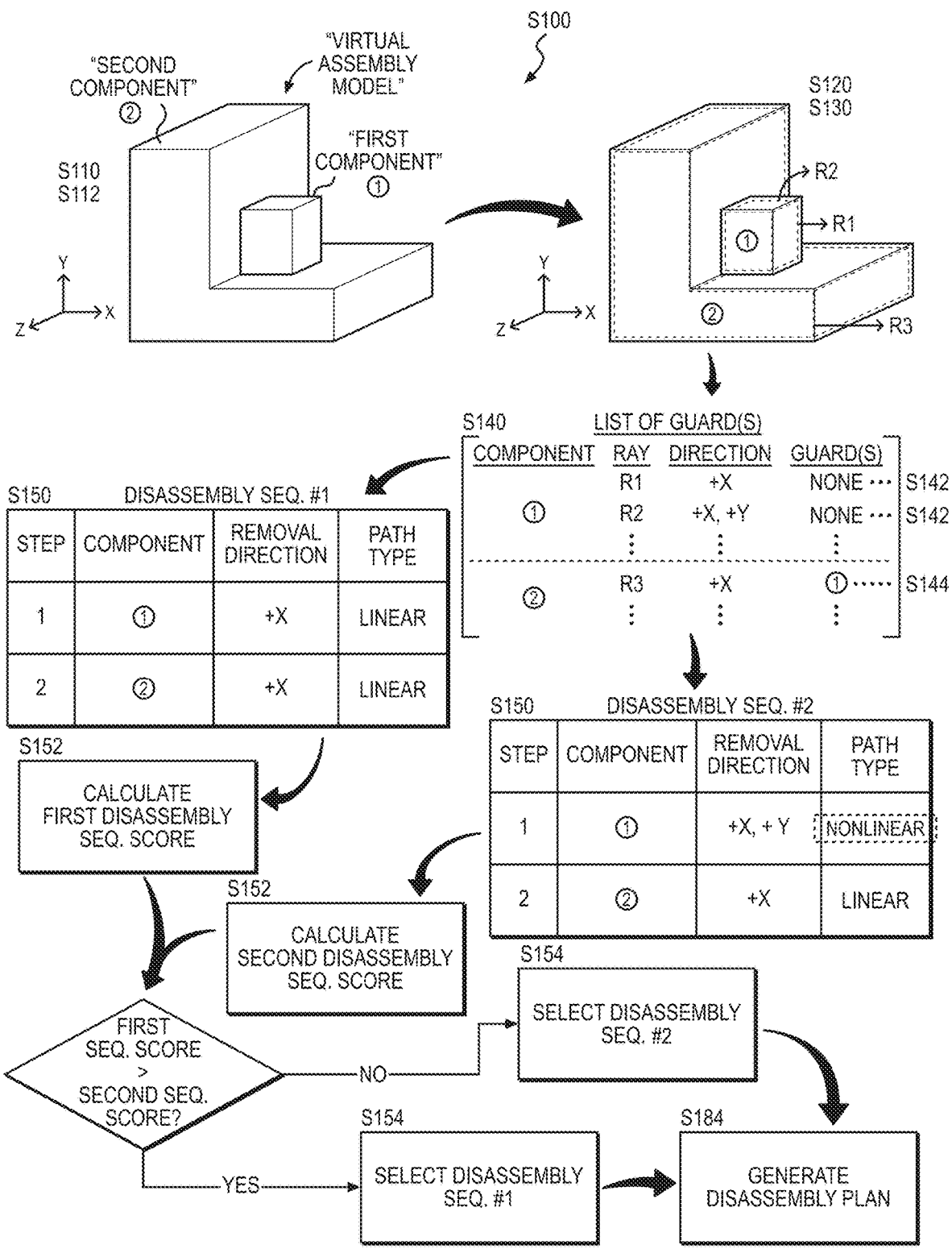
FIG. 4 is a flowchart representation of a variation of the method.

As shown in FIGS. 1, 2, and 4, a method S100 includes: accessing a virtual assembly model of an assembly, the virtual assembly model including a set of virtual components including a first virtual component and a second virtual component in Block S110; and initializing a list of guards corresponding to the virtual assembly model in Block S140. The method S100 further includes, for the first virtual component: defining a first virtual shell inset from a first surface of the first virtual component in Block S120; and generating a first constellation of rays emanating from the first virtual shell in Block S122.

The method S100 also includes: for a first ray, in the first constellation of rays, extending in a first direction, virtually traversing the first virtual component along the first ray in Block S130; in response to the first virtual component avoiding collision with another virtual component, in the set of virtual components, when the first virtual component is traversed along the first ray, identifying the first direction as a first unrestricted escape direction for the first virtual component in the list of guards in Block S142; for a second ray, in the first constellation of rays, extending in a second direction, virtually traversing the first virtual component along the second ray in Block S130; and, in response to the first virtual shell avoiding collision with another virtual component, in the set of virtual components, when the first virtual component is traversed along the second ray, identifying the second direction as a second unrestricted escape direction for the first virtual component in the list of guards in Block S142.

The method S100 further includes, for the second virtual component: defining a second virtual shell inset from a second surface of the second virtual component in Block S120; and generating a second constellation of rays emanating from the second virtual shell in Block S122. The method S100 also includes: for a third ray, in the second constellation of rays, extending in a third direction, virtually traversing the second virtual component along the third ray in Block S130; and, in response to the second virtual component colliding with the first virtual component when the second virtual component is traversed along the third ray, identifying the third direction as a third restricted escape direction for the second virtual component in the list of guards in Block S144.

The method S100 further includes, in response to identifying the first unrestricted escape direction for the first virtual component and, in response to identifying the third restricted escape direction blocked for the second virtual component by the first virtual component, generating a first virtual disassembly sequence, for the virtual assembly model, in Block S150, that specifies: removal of the first virtual component, from the virtual assembly model, in the first direction prior to removal of the second virtual component from the virtual assembly model; and removal of the second virtual component, from the virtual assembly model, in the third direction following removal of the first virtual component.

1.1 Variation: Assembly Sequence

As shown in FIGS. 1, 3, and 5-10, a method S100 includes: accessing a virtual assembly model of an assembly, the virtual assembly model including a set of virtual components including a first virtual component and a second virtual component in Block S110. The method S100 further includes, for the first virtual component: defining a first virtual shell inset from a first surface of the first virtual component in Block S120; and generating a first constellation of rays emanating from the first virtual shell in Block S122.

This variation of the method S100 also includes: for a first ray, in the first constellation of rays, extending in a first direction, virtually traversing the first virtual component along the first ray in Block S130; in response to the first virtual component avoiding collision with another virtual component, in the set of virtual components, when the first virtual component is traversed along the first ray, identifying the first direction as a first unrestricted escape direction for the first virtual component in a list of guards corresponding to the virtual assembly model in Block S142; for a second ray, in the first constellation of rays, extending in a second direction, virtually traversing the first virtual component along the second ray in Block S130; and, in response to the first virtual shell colliding with another virtual component, in the set of virtual components, when the first virtual component is traversed along the second ray, identifying the second direction as a second restricted escape direction for the first virtual component in the list of guards in Block S144.

This variation of the method S100 further includes, for the second virtual component: defining a second virtual shell inset from a second surface of the second virtual component in Block S120; and generating a second constellation of rays emanating from the second virtual shell in Block S122. This variation of the method S100 also includes: for a third ray, in the second constellation of rays, extending in a third direction, virtually traversing the second virtual component along the third ray in Block S130; in response to the second virtual component colliding with the first virtual component when the second virtual component is traversed along the third ray, identifying the third direction as a third restricted escape direction for the second virtual component in the list of guards in Block S144; for a fourth ray, in the second constellation of rays, extending in a fourth direction, virtually traversing the second virtual component along the fourth ray in Block S130; and, in response to the second virtual shell colliding with another virtual component, in the set of virtual components, when the second virtual component is traversed along the fourth ray, identifying the fourth direction as a fourth restricted escape direction for the second virtual component in the list of guards in Block S144.

This variation of the method S100 further includes generating a first virtual assembly sequence, for the virtual assembly model, in Block S160, specifying: installation of the second virtual component, onto the virtual assembly model, opposite the third direction based on the third restricted escape direction blocked for the second virtual component by the first virtual component; and installation of the first virtual component, onto the virtual assembly model, opposite the first direction, following installation of the second virtual component onto the virtual assembly model, based on the first unrestricted escape direction for the first virtual component.

1.2 Variation: Single Virtual Component Removal

As shown in FIGS. 1, 3, and 5-7, a method S100 includes: accessing a virtual assembly model of an assembly, the virtual assembly model including a virtual component in Block S110. This variation of the method S100 further includes, for the virtual component: defining a virtual shell inset from a surface of the virtual component in Block S120; and generating a constellation of rays emanating from the virtual shell in Block S122.

This variation of the method S100 also includes: for a first ray, in the constellation of rays, extending in a first direction, virtually traversing the virtual component along the first ray in Block S130; in response to the virtual component colliding with another virtual component, in the set of virtual components, in the set of virtual components, when the virtual component is traversed along the first ray, identifying the first direction as a restricted escape direction for the virtual component in a list of guards corresponding to the virtual assembly model in Block S144; for a second ray, in the constellation of rays, extending in a second direction, virtually traversing the virtual component along the second ray in Block S130; and, in response to the virtual shell avoiding collision with another virtual component, in the set of virtual components, when the virtual component is traversed along the second ray, identifying the second direction as an unrestricted escape direction for the virtual component in the list of guards in Block S142.

This variation of the method S100 further includes generating a virtual assembly sequence, for the virtual assembly model, in Block S160, specifying installation of the virtual component, onto the virtual assembly model, opposite the second direction, prior to installation of another virtual component, in the set of virtual components, based on the unrestricted escape direction for the virtual component.

2. Applications

Generally, the method S100 can be executed by a system (e.g., a remote computer system, a computer network, a remote server) in conjunction with a user interface (e.g., a native or web application): to load a virtual assembly model representing a real assembly within a virtual component environment; to identify a set of virtual components within the virtual assembly model; to define a constellations of rays (i.e., non-parallel rays), defining a set of test disassembly directions (hereinafter "escape directions"), for each virtual component; to virtually displace each virtual component along each ray in its assigned constellation of rays within the virtual environment; to identify virtual components that each virtual component intersects when traversed along each ray in its assigned constellation of rays; and to construct a list of guards that represents these virtual component intersections (i.e., the list of virtual components intersected by each ray in the constellation of rays). The system further executes Blocks of the method S100 to automatically: transform this list of guards into a disassembly order (or "sequence") in which real components can be removed from the real assembly model and real disassembly directions to physically withdraw real components from the real assembly in order to physically disassemble the real assembly; and invert this disassembly order and corresponding disassembly directions into an assembly order and set of assembly directions within which to physically assemble real component into the real assembly.

Therefore, the system can execute Blocks of the method to construct a list of guards that represents component intersections when virtual components are traversed along escape directions defined by their assigned ray constellations. The list of guards thus represents the nearest virtual component (or "guard") that restricts (i.e., blocks, intersects) removal of a particular virtual component in each escape direction assigned to the particular virtual component. The system can thus identify a first virtual component (or subassembly) to remove from the virtual assembly model first based on detecting an empty guard value—in the list of guards—that restricts linear traversal of the first virtual component along a first escape direction. The system can then identify a second virtual component to remove from the virtual assembly model second based on: identification of the first virtual component only as restricting linear transversal of the second virtual component along a second escape direction in the list of guards; and identification of an empty guard value—in the list of guards—that restricts linear transversal of the second virtual component along the second escape direction. The system can then identify a third virtual component to remove from the virtual assembly model second based on: identification of the first and/or second virtual component(s) only as restricting linear transversal of the third virtual component along a third escape direction in the list of guards; and identification of an empty guard value—in the list of guards—that restricts linear transversal of the third virtual component along the third escape direction.

The system can thus derive a virtual disassembly sequence in which to disassemble virtual components from the virtual assembly model and virtual directions in which to traverse these virtual components in order to separate them from the virtual assembly model without collision with remaining virtual components within the virtual assembly model.

For example, the system can execute Blocks of the method S100: to identify a first unrestricted escape direction for a first virtual component within the virtual assembly model; to virtually remove the virtual component from the virtual assembly model by displacing the first virtual component along the first unrestricted escape direction; and to remove the virtual component as a guard for remaining virtual components of the virtual assembly model within the list of guards. The system can then iteratively repeat this process: to identify an unrestricted escape direction for a next virtual component in the virtual assembly model based on guards represented in the exterior housing list of guards; to remove this next virtual component from the virtual assembly model by traversing this next virtual component along its unrestricted escape direction; and to update the list of guards to reflect removal of this next virtual component from the virtual assembly model.

The system can thus rapidly construct a virtual disassembly sequence for the virtual assembly model by recursing (or "iterating") through the guards-present along each tested escape direction for each virtual component in the virtual assembly model-represented in the singular list of guards generated during the single virtual test phase, thereby eliminating a need to recalculate the list of guards or reprocess the virtual assembly model after each subsequent virtual component removal from the virtual assembly model.

2.1 Buildable Assemblies

In particular, the system can execute Blocks of the method to construct a matrix representing many (or all) possible directions within which each individual virtual component in the virtual assembly model may be separated from other virtual component(s) in the virtual assembly model within a single virtual test phase, such as: with no prima facie contextual information about the function or purpose of individual real components or the real assembly as a whole; and with no or minimal computation allocated to interpreting context of virtual components within the virtual assembly model.

Based on component intersections—and lack of component intersections—along each escape direction for each virtual component as represented in the list of guards, the system can then automatically: detect and define virtual subassemblies of virtual components that must be removed from the virtual assembly model together; to derive an operation order and removal directions in which to remove virtual components and virtual subassemblies from the virtual component; and to derive an operation order and removal directions in which to remove virtual components from each virtual subassembly. By inverting these operation orders and removal directions, the system can thus automatically: identify real subassemblies of real components; and define an assembly order and assembly directions for assembling corresponding real components and real subassemblies into the real assembly.

The system can also: virtually traverse virtual components within the virtual environment along their identified escape directions in order to construct a disassembly visualization of real disassembly of real components; and reverse this disassembly visualization to construct an assembly visualization of real assembly of real components.

2.2 Unbuildable Assemblies

Additionally or alternatively, the system can detect virtual disassembly failures in which no order of virtual traversal of the virtual components (in any linear and/or non-linear virtual direction within the virtual environment) yields a feasible disassembly sequence of all virtual components within the virtual assembly model. Accordingly, the system can flag the real assembly as unbuildable and requiring redesign.

Alternatively, the system can autonomously execute maximum possible virtual disassembly of the virtual assembly model; render the remaining virtual assembly model within the virtual environment; and prompt a user to manually remove a particular blocking virtual component from the virtual assembly model within the virtual environment before resuming autonomous virtual disassembly of the virtual assembly model.

Therefore, the system can: automatically identify impossible real assemblies; and selectively prompt intra-operative user feedback when removal of a particular virtual component and the corresponding escape direction is not directly represented in the list of guards generated during the single preceding virtual test phase.

2.3 Multiple Assembly Sequences

Additionally or alternatively, the system can rank each virtual assembly sequence in a set of feasible virtual assembly sequences derived for a virtual assembly model, such as based on a particular bias. For example, the system can characterize various attributes of each feasible virtual assembly sequence and selectively render a virtual assembly sequence that prioritizes: increased sequence efficiency (e.g., a relatively low quantity of installation steps); decreased sequence complexity (e.g., relatively simple installation steps); and/or decreased manufacturing costs (e.g., relatively low tooling or fixturing costs). Additionally or alternatively, the system can selectively render a virtual assembly sequence that aligns with a user-specified installation order, such as installation of a particular component prior to another.

In one example, for a virtual assembly model of a virtual robotic arm including a virtual base structure and a virtual actuator, the system: derives a first virtual assembly sequence specifying installation of the virtual base structure onto a virtual mounting platform prior to installing the virtual actuator on the virtual base structure; derives a second virtual assembly sequence specifying installation of the virtual actuator prior to installation of the virtual base structure onto the mounting platform; and selects the first virtual assembly sequence characterized by a relatively greater structural stability and ease of installation during assembly of the virtual robotic arm.

Accordingly, the system can: rapidly derive a set of feasible virtual assembly sequences for a virtual assembly model; and selectively render a particular virtual assembly sequence that increases installation efficiency, decreases installation complexity, decreases manufacturing costs, and/or accommodates user preferences.

2.4 Remote v. Local Execution

Generally, the method S100 is described herein as executed by a remote computer system in conjunction with a user interface (e.g., a native application or web application) executing on a computing device (e.g., a mobile device, a computer). However, the method S100 can additionally or alternatively be executed by a local computer system in conjunction with the user interface executing on the computing device.

3. Terms

A "virtual component" or interchangeably "discrete virtual component" is referred to herein as a three-dimensional representation of a part within a virtual assembly. Each virtual component corresponds to a real component of a real assembly.

A "virtual assembly" is referred to herein as a three-dimensional representation including a set of virtual components (i.e., two or more discrete virtual components). The virtual assembly depicts positions, orientations, and interactions between the set of virtual components. Each virtual assembly corresponds to a real assembly.

A "virtual subassembly" is referred to herein as a subset of virtual components (i.e., two or more discrete components) within a virtual assembly. Each virtual subassembly corresponds to a real subassembly of a real assembly.

A "guard" is referred to herein as a virtual component restricting movement and/or removal of another virtual component within the virtual assembly.

A "list of guards" is referred to herein as a matrix associated with a virtual assembly model and representing guards for each virtual component of the virtual assembly. In particular, for each virtual component in the virtual assembly model, the list of guards can represent each escape direction and the corresponding guards blocking the escape direction (e.g., via a numerical component identifier) for the virtual component.

An "unrestricted escape direction" is referred to herein as a direction of movement (for a virtual component and/or subassembly) resulting in no collisions with other virtual components in the virtual assembly model. An unrestricted escape direction is represented in a list of guards as an escape direction corresponding to an "empty" guard value.

4. Virtual Assembly Model Ingest

Blocks of the method S100 recite: accessing a virtual assembly model of an assembly in Block S110; and identifying a set of virtual components within the virtual assembly model in Block S112. Generally, the system can access a virtual assembly model including a set of virtual components (e.g., a three-dimensional CAD file) and identify each virtual component and the corresponding features defining the virtual assembly model. In particular, the system can interface with a user interface (e.g., a native application or web application) executing on a computing device (e.g., a mobile device, a computer) to access the virtual assembly model. In one implementation, the system can: access the virtual assembly model including a set of virtual components; and parse the virtual assembly model to identify each virtual component in the set of virtual components. The system can then, for each virtual component: identify a set of features defining the virtual component (e.g., lines, edges, surfaces, holes), each feature corresponding to a feature type (e.g., cylindrical surface). The system can then derive feasible escape directions for each virtual component based on the geometries and configurations of the virtual components within the virtual assembly model.

5. Virtual Shell

Block S120 of the method S100 recites, for a virtual component, defining a virtual shell inset from a surface of the virtual component. Generally, in Block S120, for the virtual component, the system can define a virtual shell as a virtual boundary inset from an outer volume of the virtual component (e.g., inset between 0.001 inch to 0.010 inch). In particular, the system can define the virtual shell exhibiting a geometry congruent with the geometry of the virtual component. For example, for a virtual component, such as a virtual cube, the system can define a virtual shell exhibiting a cubic geometry and inset from the outer volume of the virtual cube by 0.001 inch.

In one variation, the system can define an inset distance for the virtual shell based on the virtual component type. In this variation, the system can access a virtual assembly model including a first virtual component and a second virtual component. The system can then: identify the first virtual component as a non-fastener component based on a first geometry of the first virtual component; in response to identifying the first virtual component as the non-fastener component, assign a first inset distance to the first virtual shell; and define the first virtual shell inset from the first surface of the first virtual component by the first inset distance. The system can then: identify the second virtual component as a fastener component based on a second geometry of the second virtual component; in response to identifying the second virtual component as the fastener component, assign a second inset distance, greater than the first inset distance, to the second virtual shell; and define the second virtual shell inset from the second surface of the second virtual component by the second inset distance. By defining the virtual shell and displacing the virtual shell, rather than the virtual component, the computer system can prevent misclassification of an adjacent component as a guard. More specifically, by insetting the virtual shell, the system can differentiate between direct component-to-component interactions from incidental surface contact between adjacent components, as discussed in detail below.

6. Linear Ray Casting+Escape Directions

Blocks of the method S100 recite: for a virtual component in the virtual assembly model, generating a constellation of rays emanating from the virtual shell in Block S122; and, for a first ray, in the constellation of rays, extending in a first direction, virtually traversing the virtual component along the first ray in Block S130. Generally, the system implements linear ray casting techniques to: assign linear displacement test directions to a virtual component in the virtual assembly model; to detect restricted linear escape directions corresponding to collisions of a virtual component with other virtual components in the virtual assembly model when traversed along these assigned rays; and to detect unrestricted linear escape directions corresponding to absence of collisions of the virtual component with other virtual components in the virtual assembly model when traversed along these assigned rays.

6.1 A Contextual Linear Ray Casting

In one implementation, the system can: define a constellation of linear rays (e.g., between 10 and 1,000,000 non-parallel rays) emanating from a surface, an origin (e.g., a centroid), and/or a constellation of points in the first virtual component in the virtual assembly model; virtually displace (or "traverse") the first virtual component along each ray in this constellation; and detect and record each other virtual component (or "guard") that the volume of the first virtual component intersects when traversed along each ray.

For example, the system can define a constellation of non-parallel rays emanating from a constellation of points arranged in the virtual component, each ray emanating from a unique point and defining a unique escape direction. Alternatively, the system can: calculate a volumetric centroid of the first virtual component; project origins of a predefined constellation of rays onto the centroid; and align three orthogonal primary rays of the first virtual assembly model to primary axes of the virtual assembly model or the first virtual component specifically.

The system can then: compile a list of other virtual components (i.e., "guards") that collide with the first virtual component as the first virtual component is traversed along the escape directions of its assigned rays; repeat this process for each other virtual component in the virtual assembly model; and compile these lists, escape directions, and virtual component identifiers into a list of guards.

In one example, the system can: identify a first virtual component and a second virtual component within the virtual assembly model; define a first constellation of linear rays for the first virtual component including a first ray extending from the first virtual component; virtually traverse the first component along the first ray in a first direction (e.g., the positive X-direction); and, in response to the first component colliding with the second component along the first ray, record the first direction of the first ray as a restricted escape direction—restricted by the second virtual component—for the first virtual component.

The system can then: define a second ray, in the first constellation of linear rays, extending from the first virtual component in a second direction, such as a second direction antiparallel to the first direction; and implement methods and techniques described above to record collisions between the first virtual component and other components in the virtual assembly model when the first virtual component is virtually traversed along the second ray in the second direction. Additionally, the system can define a second constellation of linear rays for the second virtual component including: a third ray extending from the second virtual component in a third direction, such as a third direction nonparallel to the first direction; and a fourth ray extending from the second virtual component in a fourth direction, such as a fourth direction parallel to the first direction. The system can then implement methods and techniques described above to record collisions between the second virtual component and other components in the virtual assembly model when the second virtual component is virtually traversed along the third ray and the fourth ray. Thus, the system can interpret the geometry and configuration of each virtual component within the virtual assembly model to derive feasible escape directions for the virtual component.

Accordingly, the single list of guards can store complete information regarding order and direction for removal of virtual components from the virtual assembly model in a small, lightweight file or format. The system can then extract this information from the list of guards in order to inform a disassembly—and an assembly—sequence for the virtual assembly model and the real assembly.

6.2 Contextual Linear Ray Casting

In one variation, Blocks of the method S100 recite: in response to detecting the first surface of the first virtual component within a predefined threshold of the second surface of the second virtual component, characterizing a first mating type of the first surface of the first virtual component in Block S114; and identifying a first set of predefined escape directions for the first virtual component based on the first mating type in Block S124.

In this variation, Blocks of the method S100 also recite: in response to detecting the second surface of the second virtual component within the predefined threshold of a third surface of a third virtual component in the set of virtual components, characterizing a second mating type, different from the first mating type, of the second surface of the second virtual component in Block S114; identifying a second set of predefined escape directions, different from the first set of predefined escape directions, for the second virtual component based on the second mating type in Block S124; and generating a composite set of predefined escape directions based on a union between the first set of predefined escape directions and the second set of predefined escape directions in Block S126.

In this variation, the system can define a constellation of linear rays for a virtual component based on the geometry of the virtual component and/or mating surfaces of the virtual component (e.g., cylindrical, planar, and/or spherical surfaces abutting or falling within a threshold distance of complementary surfaces of other virtual components in the virtual assembly model). In particular, the system can: identify a type or characteristic of a surface of the virtual component that falls within a threshold distance (e.g., 0.050") of a surface of another virtual component in the virtual assembly model; and retrieve a predefined constellation of rays—corresponding to common escape directions—for this surface type or characteristic, such as from a predefined lookup table; project origins of this predefined constellation of rays onto this surface of the virtual component; and align a set of (e.g., one, two, or three) orthogonal primary rays in this constellation to primary axes of the virtual assembly model, the first virtual component specifically, or to an edge of this surface of the virtual component.

In this variation, the system can: access a virtual assembly model including a first virtual component and a second virtual component; and, in response to detecting a first surface of the first virtual component within a predefined threshold of a second surface of the second virtual component, characterize a first mating type of the first surface of the first virtual component. The system can then: retrieve a first set of predefined escape directions, associated with the first mating type, for the first virtual component; and generate a first constellation of rays for the first virtual component. In particular, to generate the first constellation of rays, the system can: define a first origin on the first virtual component; and project a first set of rays originating from the first origin, each ray in the first set of rays aligned to a predefined escape direction in the first set of predefined escape directions.

Additionally, in response to detecting the second surface of the second virtual component within the predefined threshold of a third surface of a third virtual component in the set of virtual components, the system can: characterize a second mating type, different from the first mating type, of the second surface of the second virtual component; and retrieve a second set of predefined escape directions, different from the first set of predefined escape directions and associated with the second mating type, for the second virtual component based on the second mating type. The system can then generate a composite set of predefined escape directions based on a union between the first set of predefined escape directions and the second set of predefined escape directions. In particular, in response to identifying the second set of predefined escape directions, the system can generate the first constellation of rays for the first virtual component by projecting the first set of rays originating from the first origin, each ray in the first set of rays aligned to a predefined escape direction in the composite set of predefined escape directions. Furthermore, the system can generate a second constellation of rays for the second virtual component by: defining a second origin on the second virtual component; and projecting a second set of rays originating from the second origin, each ray in the second set of rays aligned to a predefined escape direction in the composite set of predefined escape directions. Thus, the system can refine escape direction calculations by constraining the set of feasible escape directions based on known geometric relationships between the set of virtual components.

In one example, the system can: identify a virtual cylinder (i.e., a first virtual component) housed within a virtual bore within a virtual assembly model; identify a cylindrical surface of the virtual cylinder as a mating surface; identify a primary escape direction (e.g., coaxial with a central axis of the cylindrical surface) and a set of secondary escape directions (e.g., orthogonal to the primary escape direction) defined for the mating surface; project a predefined constellation of rays extending along the primary and secondary escape directions; and align three orthogonal rays of the cylinder to the primary and secondary escape directions.

In another example, the system can: identify a first planar surface of a first virtual component adjacent a second planar surface of a second virtual component within a virtual assembly model; identify the first planar surface as a mating surface; identify a primary escape direction (e.g., orthogonal to the first planar surface) and a set of secondary escape directions (e.g., orthogonal to the primary escape direction) defined for the mating surface (i.e., a planar surface); project a predefined constellation of rays extending along the primary and secondary escape directions; and align three orthogonal rays of the first planar surface to the primary and secondary escape directions. Thus, the system can interpret the geometry and configuration of the mating surfaces (e.g., any combination of interacting cylindrical, planar, and/or spherical surfaces) of each virtual component within the virtual assembly model to derive feasible escape directions.

7. Guard Detection

Blocks of the method S100 recite: initializing a list of guards corresponding to a virtual assembly model in Block S140; for a virtual component in the virtual assembly model, generating a constellation of rays emanating from the virtual shell in Block S122; for a first ray, in the constellation of rays, extending in a first direction, virtually traversing the first virtual component along the first ray in Block S130; in response to the virtual component avoiding collision with another virtual component, in the set of virtual components, when the virtual component is traversed along the first ray, identifying the first direction as an unrestricted escape direction for the virtual component in the list of guards in Block S142; for a second ray, in the constellation of rays, extending in a second direction, virtually traversing the first virtual component along the second ray in Block S130; and, in response to the virtual shell colliding with another virtual component, in the set of virtual components, when the virtual component is traversed along the second ray, identifying the second direction as a restricted escape direction for the virtual component in the list of guards in Block S144.

Generally, for each virtual component in the virtual assembly model, the system can: detect and record each virtual component (or "guard") preventing removal of the virtual component in each escape direction in a list of guards associated with the virtual assembly model. In one implementation, for a first virtual component in the virtual assembly model, the system can: virtually traverse the virtual shell along each linear ray, in the constellation of linear rays; and record each collision between the virtual shell and another virtual component in the list of guards.

In particular, in this implementation, the system can virtually traverse the virtual shell an infinite distance along the first ray to detect each adjacent and proximal guard for the first virtual component. Furthermore, the system can define and displace the virtual shell (e.g., a virtual shell inset from the outer volume by 0.002 inch), rather than the first virtual component, to prevent misclassification of an adjacent component as a guard. In response to the first virtual component avoiding collision with another component, in the set of virtual components, when the first virtual component is traversed along the first ray, the system can identify the first direction as an unrestricted escape direction for the first virtual component in the list of guards.

In particular, within a virtual environment containing the virtual assembly model, the system can search for virtual contact (i.e., virtual interference) between the virtual shell and each virtual shell of each virtual component in the set of virtual components when the virtual shell is traversed along a ray. In response to absence of virtual contact (i.e., maintaining spatial clearance) between the virtual shell and each virtual shell of each virtual component in the set of virtual components, the system can identify the direction as an unrestricted escape direction for the virtual component.

Alternatively, in response to the virtual shell colliding with another component when the first virtual component is traversed along the first ray, the system can flag the first direction as a restricted escape direction for the first virtual component in the list of guards. In particular, in response to the virtual shell colliding with (i.e., virtually contacting) a virtual shell of another virtual component, in the set of virtual components, when the virtual shell is traversed along a ray, the system can identify the direction as a restricted escape direction for the virtual component.

For example, the system can: associate each virtual component in the set of virtual components with a component identifier (e.g., a numerical identifier); and, in response to a collision with a first virtual component, associate the component identifier of the first virtual component with the first ray in the list of guards. The system can then repeat this process to detect each collision along each ray in the constellation of linear rays and flag the corresponding directions in the list of guards. Furthermore, the system can record a distance between the virtual shell and the corresponding guard to identify partially unrestricted escape directions, as discussed in detail below. The system can then repeat this process for each virtual component in the virtual assembly model to generate the list of guards representing: directions of linear movements resulting in collisions with other virtual components in the virtual assembly model; and directions of linear movements of virtual components resulting in no collisions with other virtual components in the virtual assembly model.

8. Disassembly Sequence

Block S150 of the method S100 recites generating a virtual disassembly sequence for the virtual assembly model. Generally, in Block S150, the system can create a disassembly sequence for the virtual assembly model by removing each virtual component in a particular linear escape direction based on the list of guards generated for the virtual assembly model, as illustrated in FIGS. 2 and 4.

Generally, upon compiling the list of guards for the virtual assembly model, the system can: identify a first virtual component with a first unrestricted escape direction; remove the first virtual component from the virtual assembly model by displacing the first virtual component along the first unrestricted escape direction (i.e., an infinite distance along the first escape direction); and remove the first virtual component from the list of guards. The system can then recurse through the list of guards to remove each virtual component in the virtual assembly model along the corresponding unrestricted escape direction until the virtual assembly model is disassembled (i.e., all components are removed). In response to disassembling the virtual assembly model (i.e., identification of empty guard values in the list of guards), the system can generate and/or store a virtual disassembly sequence representing the sequence of component removal steps. In particular, during a first time window (e.g., at a local computing device), the system can: initialize the list of guards corresponding to the virtual assembly model; and identify restricted and/or unrestricted escape directions for a virtual component in the list of guards. Then, during a second time window, succeeding the first time window (e.g., at the local computing device), the system can generate a virtual disassembly sequence and a virtual assembly sequence for the virtual assembly model.

In one implementation, the system can access a virtual assembly model including a first virtual component and a second virtual component. The system can then implement methods and techniques described above: to record collisions between the first and second virtual components and other components in the virtual assembly model; and to identify unrestricted escape directions for the first and second virtual components. In particular, the system can identify: a first direction as a first unrestricted escape direction for the first virtual component; and a second direction as a second restricted escape direction for the second virtual component, the second restricted escape direction blocked for the second virtual component by the first virtual component.

The system can then generate a virtual disassembly sequence for the virtual assembly model in response to identifying the first unrestricted escape direction for the first virtual component and, in response to identifying the second restricted escape direction blocked for the second virtual component by the first virtual component. In particular, the system can generate the virtual disassembly sequence specifying: removal of the first virtual component, from the virtual assembly model, in the first direction prior to removal of the second virtual component from the virtual assembly model; and removal of the second virtual component, from the virtual assembly model, in the second direction following removal of the first virtual component.

In one example, the virtual assembly model includes a set of virtual components including a virtual fastener (i.e., a first virtual component) affixed to a virtual bore defined in a virtual object (i.e., a second virtual component). In this example, for the virtual fastener, the system can: identify a primary escape direction (e.g., along the positive X-axis) and a secondary escape direction (e.g., along the positive Y-axis); initialize a list of guards associated with virtual assembly model; define a virtual shell inset from an outer volume of the virtual fastener; virtually traverse the virtual shell along the primary and secondary escape directions; and record each collision between the virtual shell and the virtual object in the list of guards. The system can then repeat this process to record collisions for the virtual object in the list of guards. The system can then parse the list of guards to identify a virtual component with an unrestricted escape direction. In particular, in this example, in response to identifying the primary escape direction as a first unrestricted escape direction for the virtual fastener, the system can: remove the virtual fastener from the virtual assembly model by displacing the virtual fastener along the primary escape direction; and remove the virtual fastener from the list of guards.

The system can then identify a second direction as a second unrestricted escape direction for the virtual object. Upon disassembling the virtual assembly model (i.e., identification of empty guard values in the list of guards), the system can generate a virtual disassembly sequence for the virtual assembly model that specifies: removal of the virtual fastener, from the virtual assembly model, along the primary escape direction prior to removal of the virtual object; and removal of the virtual fastener, from the virtual assembly model, along the second direction following removal of the virtual fastener from the virtual assembly model. Therefore, the system can rapidly construct a linear disassembly sequence by recursing (or "iterating") through the list of guards upon removal of each virtual component, thereby eliminating the need to recalculate the list of guards at each iteration.

9. Assembly Sequence

Block S160 of the method S100 recites generating a virtual assembly sequence for the virtual assembly model. Generally, in Block S160, the system can generate a virtual assembly sequence for the virtual assembly model by inverting the virtual disassembly sequence, as illustrated in FIG. 1. In particular, the system can invert the virtual disassembly sequence to generate the virtual assembly sequence such that the sequence of virtual component installation steps corresponds to an inversion of the virtual component removal steps.

In one implementation, the system can implement methods and techniques described above to generate a virtual disassembly sequence specifying: removal of a first virtual component, in a set of virtual components in a virtual assembly model, from the virtual assembly model, in a first direction prior to removal of a second virtual component, in the set of virtual components, from the virtual assembly model; and removal of the second virtual component, from the virtual assembly model, in a second direction following removal of the first virtual component.

The system can then generate a virtual assembly sequence for the virtual assembly model based on an inverse of the virtual disassembly sequence. In particular, the system can generate a virtual assembly sequence specifying: installation of the second virtual component, onto the virtual assembly model, opposite the second direction; and installation of the first virtual component, onto the virtual assembly model, opposite the first direction, following installation of the second virtual component onto the virtual assembly model.

For example, in the preceding example, the system can generate a virtual assembly sequence for the virtual assembly model that specifies: installation of the virtual fastener, onto the virtual assembly model, opposite the second direction prior to installation of the virtual fastener; and installation of the virtual fastener, onto the virtual assembly model, opposite the primary escape direction. Accordingly, the system can: rapidly derive a series of feasible virtual disassembly sequences for the virtual assembly model; and invert each feasible virtual disassembly sequence to generate a corresponding virtual assembly sequence representing an ordered set of installation instructions for assembling the physical counterpart of the virtual assembly model.

10. Assembly+Disassembly Plan

Figure 11A:
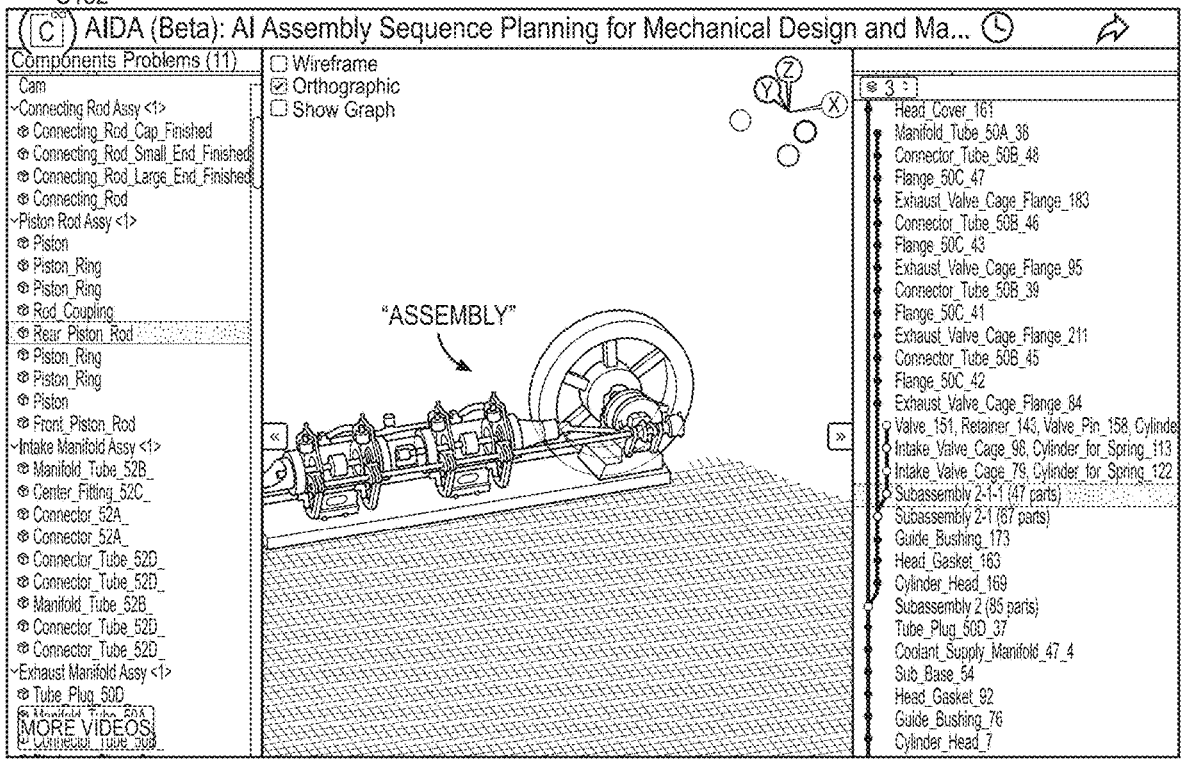
FIGS. 11A and 11B are flowchart representations of a variation of the method.
Figure 11B:
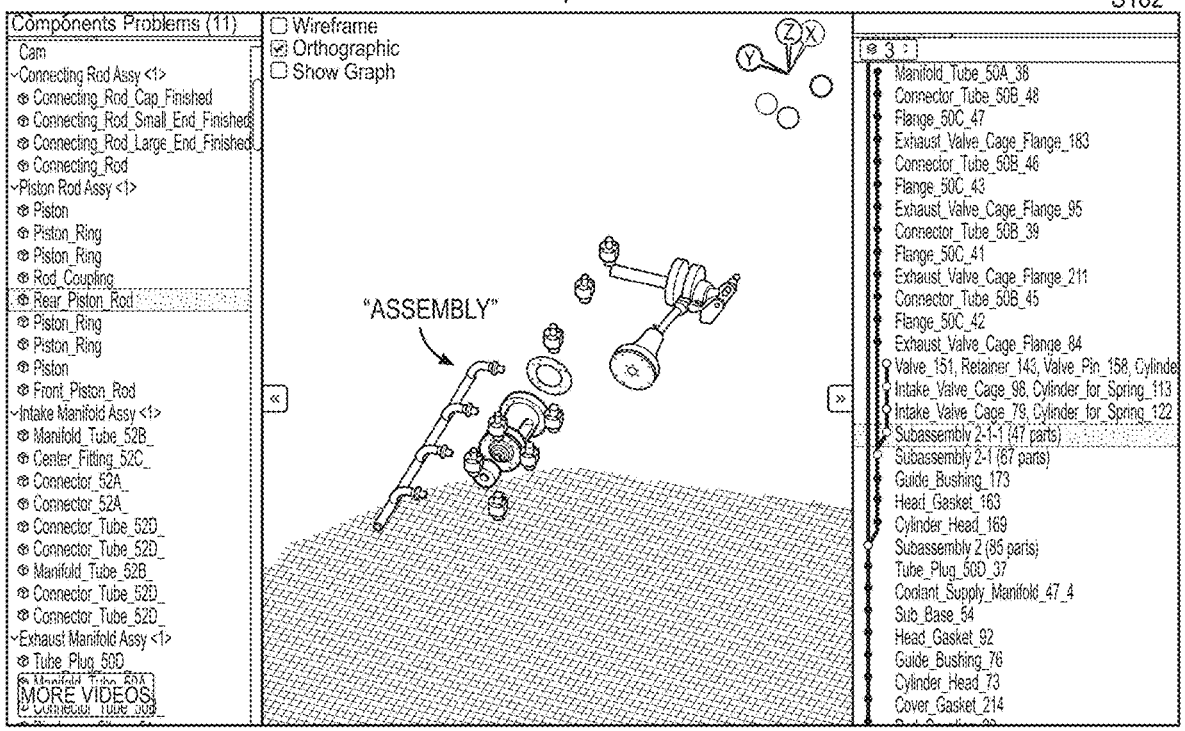

Blocks of the method S100 recite: generating a first visual representation depicting removal of a set of components forming the assembly according to the virtual disassembly sequence in Block S184; generating a second visual representation depicting installation of a set of components forming the assembly according to the virtual assembly sequence in Block S180; and rendering the first visual representation and the second visual representation via a user interface in Block S182. Generally, as shown in FIGS. 11A and 11B, the system can generate a disassembly plan including a visual representation (e.g., video file, text file) of the virtual disassembly sequence, and an assembly plan including a visual representation (e.g., video file, text file) of the virtual assembly sequence, such that the assembly and disassembly sequences can be reproduced to assemble and disassemble the real assembly.

In one implementation, the system can generate an assembly plan (i.e., a visual representation) for the virtual assembly model depicting each step in the virtual assembly sequence (i.e., upon installation of each virtual component and/or subassembly). In particular, in this implementation, for a virtual assembly model, the system can: access the virtual assembly sequence derived and/or selected for the virtual assembly model; for each virtual component in the virtual assembly model, extract a sequence identifier corresponding to the virtual component; and generate the visual representation representing installation of each virtual component, in order, based on ascending sequence identifiers.

In one example, a virtual assembly model includes: a first virtual component; and a second virtual component installed, onto the virtual assembly model, prior to the first virtual component. In this example, the system: generates a first instruction representing installation of the second virtual component, onto the virtual assembly model, opposite a second escape direction for the second virtual component, prior to installation of the first virtual component; generates a second instruction representing installation of the first virtual component, onto the virtual assembly model, opposite a first escape direction for the first virtual component, following installation of the second virtual component; and generates a visual representation depicting installation of a set of components forming the assembly according to the first virtual assembly sequence. In particular, the system generates the visual representation depicting: installation of a second component, corresponding to the second virtual component, according to the first instruction; and installation of a first component, corresponding to the first virtual component, according to the second instruction. The system then renders the visual representation via the user interface for a user to review.

In one variation, for each virtual component, the system can: extract a component identifier, a sequence identifier, and an escape direction corresponding to the virtual component from the disassembly plan; and transform the component identifier, the sequence identifier, and the escape direction into an instruction in the disassembly plan (e.g., in step 1, remove component A in the positive X-direction). The system can then display the disassembly plan to the user (e.g., via the user interface), as shown in FIG. 2. Furthermore, the system can implement methods and techniques described above to generate an assembly plan including a representation of the virtual assembly model at each step in the virtual assembly sequence (i.e., upon offering up of each component and/or subassembly). Therefore, the system can generate a visual representation of an assembly and/or disassembly plan effectively conveying the feasibility and sequencing of steps to assemble and/or disassemble a part.

11. Virtual Subassemblies

Figure 3:
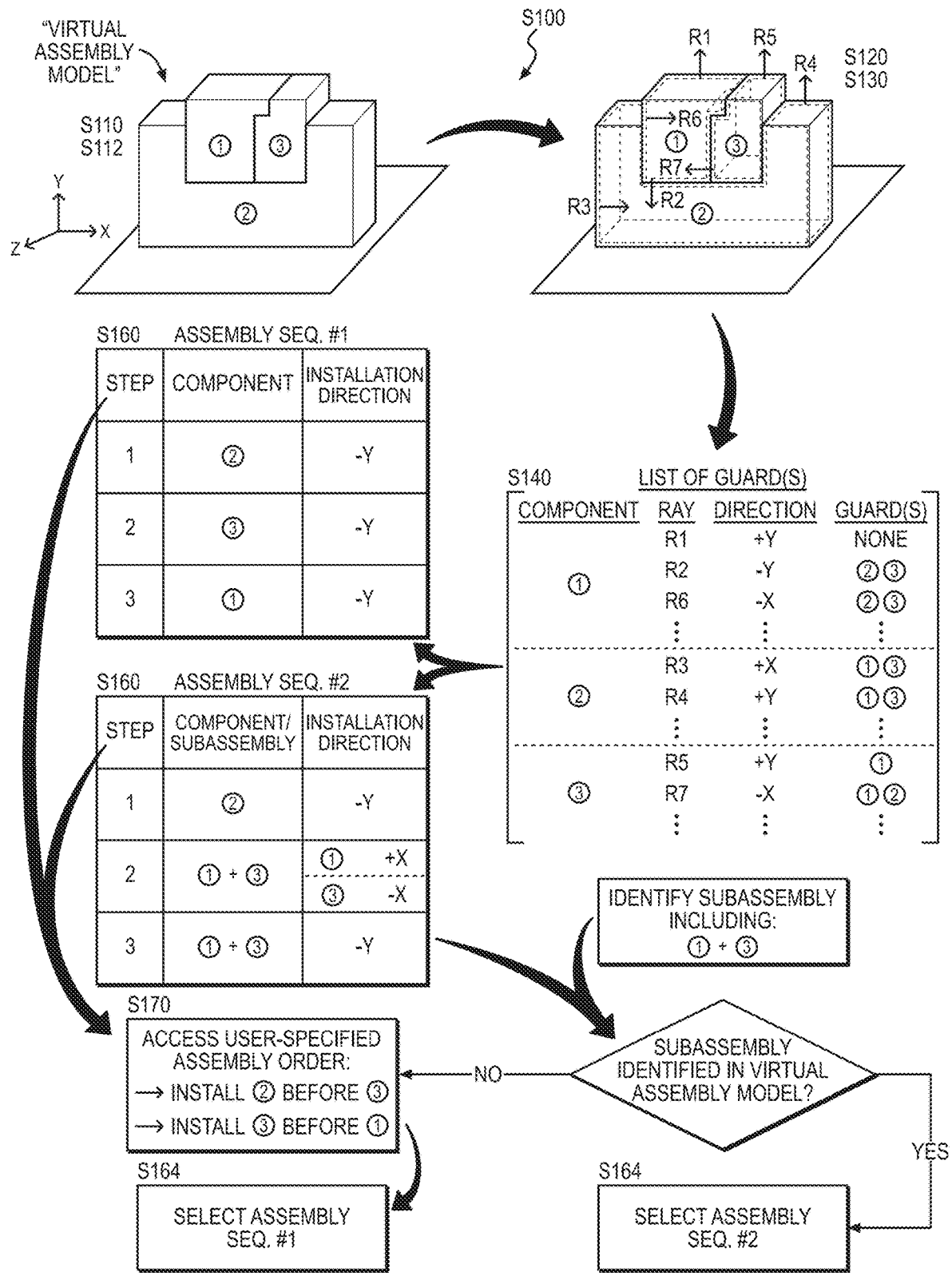
FIG. 3 is a flowchart representation of a variation of the method.

In one variation, as shown in FIGS. 3 and 10, the system can identify virtual subassemblies in the virtual assembly model based on guard and escape direction information contained in the list of guards. In particular, based on the list of guards, the system can detect a group of virtual components that each: block other virtual components in the same group; and share a common escape direction that is not obstructed by any virtual component external to the group when each other virtual component in the group is removed from the virtual assembly model and further removed from the list of guards (i.e., internal restrictions between components within the group are ignored). The system can then: label this group of virtual components as a virtual subassembly; remove the virtual subassembly from the virtual assembly model by moving the virtual subassembly along this common unrestricted escape direction; disassemble the virtual subassembly by removing the two adjacent virtual components from one another; and repeat the foregoing methods and techniques to continue virtual disassembly of this virtual subassembly and the remainder of the virtual assembly model based on the same guard and escape direction information in the list of guards (e.g., via removal of another virtual subassembly and/or discrete virtual components).

In this variation, the system can access a virtual assembly model including a first virtual component and a second virtual component. Then, upon compiling the list of guards for the virtual assembly model, the system can identify a virtual subassembly including a set of (e.g., two or more) adjacent virtual components sharing a common (i.e., shared) unrestricted escape direction when simultaneously removed along the common unrestricted escape direction (i.e., unblocked by any external virtual component when removed simultaneously).

In particular, the system can identify a virtual subassembly including the first virtual component and the second virtual component in response to identifying: a first restricted escape direction blocked by the second virtual component for the first virtual component; and a second restricted escape direction, parallel to the first restricted escape direction, blocked by the first virtual component for the second virtual component. More specifically, the system can identify the virtual subassembly unblocked along the first unrestricted escape direction when the first virtual component and the second virtual component are simultaneously removed (i.e., as a group).

The system can then construct a virtual disassembly sequence for the virtual subassembly by: identifying a third unrestricted escape direction for the first virtual component; and removing the first virtual component from the second virtual component by displacing the first virtual component along the third unrestricted escape direction.

The system can then recurse through the list of guards to remove each virtual component and/or virtual subassembly in the virtual assembly model along the corresponding unrestricted escape direction until the virtual assembly model is disassembled. In response to disassembling the virtual assembly model (i.e., identification of empty guard values in the list of guards), the system can: generate and/or store the virtual disassembly sequence representing a sequence of virtual subassembly and component removal steps; and invert the virtual disassembly sequence to generate a virtual assembly sequence representing a sequence of virtual subassembly and component installation steps.

In one example, the virtual assembly model includes a set of five virtual components including virtual components A, B, C, D, and E, as shown in FIG. 8. In this example, the system can: identify a virtual subassembly including virtual components A, B, and C corresponding to an unrestricted escape direction (e.g., along the positive Y-axis); remove the virtual subassembly from the virtual assembly model by displacing the virtual subassembly along the unrestricted escape direction; and remove virtual components A, B, and C from the list of guards for virtual components D and E. The system can then disassemble the virtual subassembly by: removing virtual component A from virtual component B by displacing virtual component A along a first unrestricted escape direction (e.g., along the negative X-axis); and removing virtual component C from virtual component B by displacing virtual component C along a second unrestricted escape direction (e.g., along the positive X-axis). The system can then remove virtual component E from virtual component D by displacing virtual component E along a third unrestricted escape direction (e.g., along the positive X-axis).

In this variation, the system can segment the disassembly of sophisticated and/or complex assemblies into smaller, less-complex subassemblies. Therefore, the system can leverage virtual subassemblies: to increase the quantity of feasible disassembly plans by displacing virtual subassemblies in addition to discrete virtual components; and to yield straightforward and efficient disassembly sequences.

11.1 Virtual Subassembly Identification Based on Assembly Tree

In one variation, the system can identify a virtual subassembly in the virtual assembly model based on virtual component information contained in an assembly tree (e.g., a manufacturing bill of materials or "MBOM", an engineering bill of materials or "EBOM") associated with the virtual assembly model. In this variation, the system can: access an assembly tree corresponding to the virtual assembly model and representing hierarchical relationships of virtual components in the virtual assembly model; and identify a virtual subassembly, in the set of virtual components, including the first virtual component and a second virtual component defined in the assembly tree.

For example, the system can identify the virtual subassembly in the assembly tree by: detecting a grouping of the first virtual component and a second virtual component linked under a common parent node; inferring a relationship between the first virtual component and a second virtual component based on a structural or functional grouping defined in the assembly tree; and/or identifying a subassembly indicator in the assembly tree.

12. Variation: No Linear Escape Solution

Generally, the system can implement methods and techniques described above to derive a disassembly sequence including linear displacements (or "translations") to remove each virtual component from the virtual assembly model. However, in response to failing to generate a linear disassembly sequence (i.e., all components and subassemblies are restricted along each escape direction), the system can implement alternative sequencing to generate the disassembly sequence. In one implementation, the system can: identify a first virtual component, a second virtual component, and a third virtual component within a virtual assembly model; identify a first unrestricted escape direction corresponding to the first virtual component; remove the first virtual component from the virtual assembly model by displacing the first virtual component along the first unrestricted escape direction; and remove the first virtual component from the list of guards.

In response to identifying the third virtual component restricted along each escape direction by the second virtual component, the system can: generate and/or store a partial disassembly sequence representing the removal of the first virtual component; and flag the second virtual component and the third virtual component for review (e.g., by a user). Additionally or alternatively, in response to identifying the third virtual component restricted along each escape direction by the second virtual component, the system can prompt the user to manually specify the virtual disassembly sequence. Thus, the system executes a binary evaluation to assess the feasibility of disassembly of the virtual assembly model. Furthermore, the system can implement the binary evaluation in conjunction with user feedback to construct a feasible disassembly sequence.

13. Variation: Multiple Escape Directions Per Component or Subassembly

Figure 6:
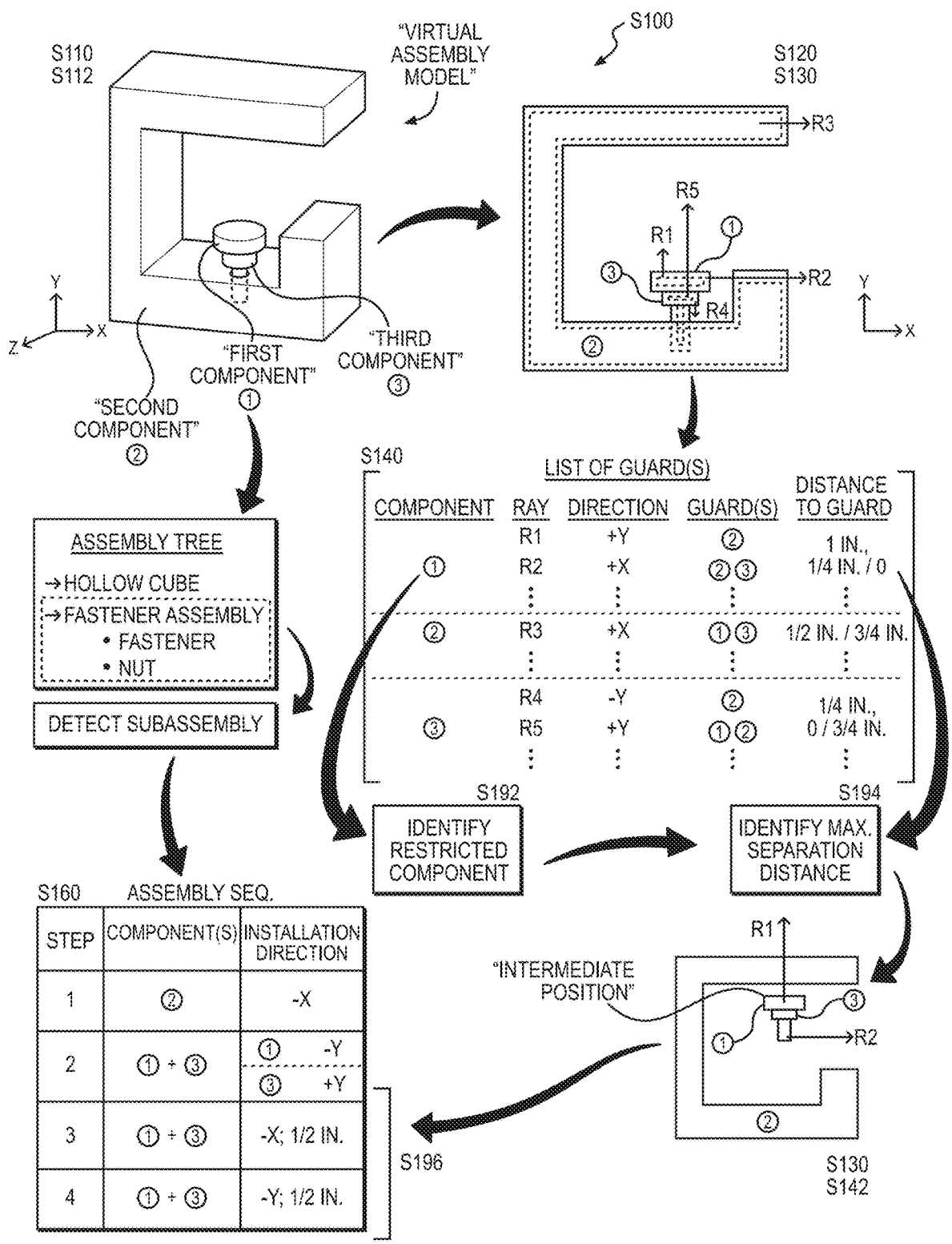
FIG. 6 is a flowchart representation of a variation of the method.
Figure 7:
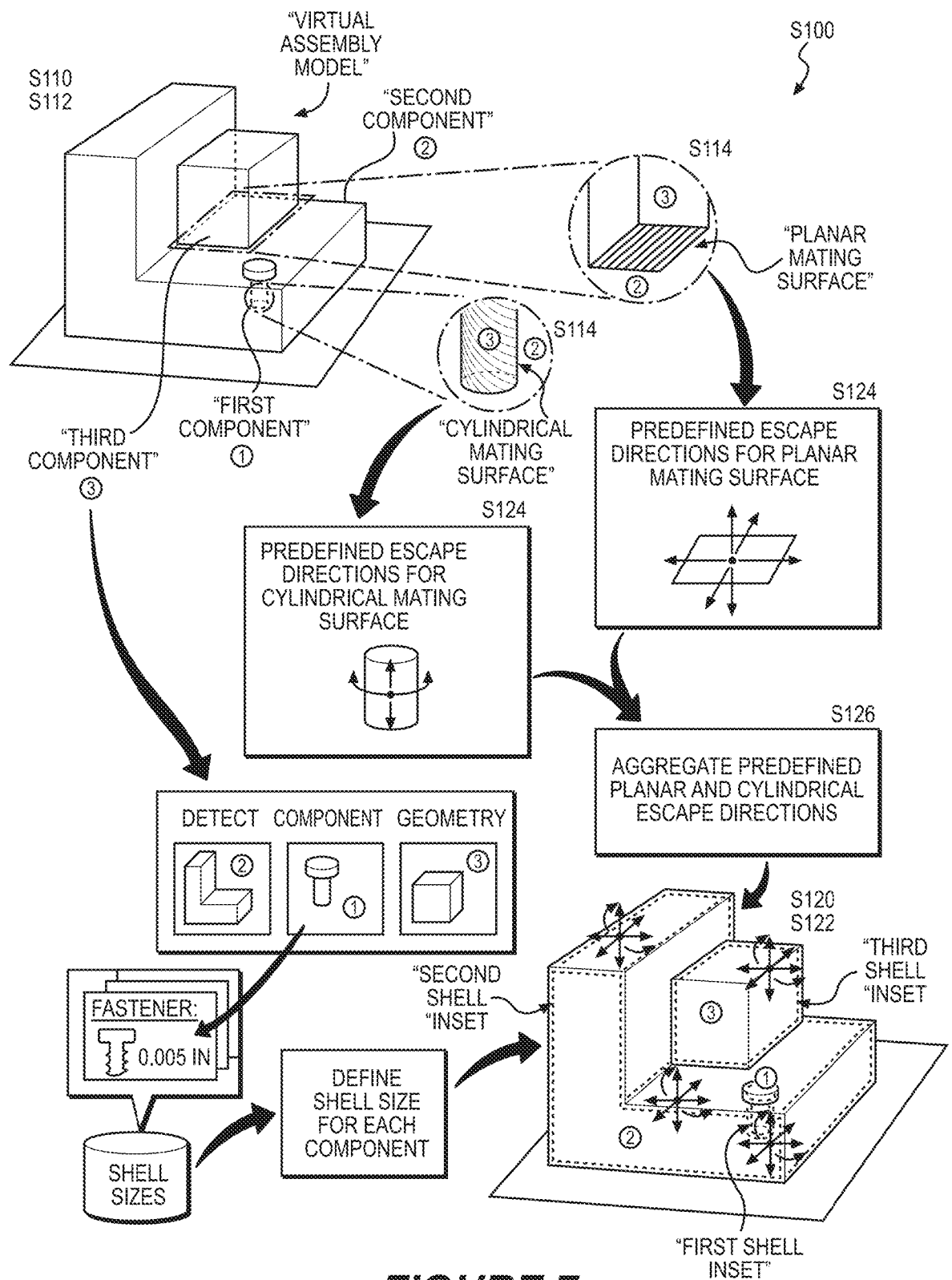
FIG. 7 is a flowchart representation of a variation of the method.

In one variation, Blocks of the method S100 recite: in response to a virtual component colliding with another virtual component, in the set of virtual components, when the virtual component is traversed along each ray, in a constellation of rays, identifying the virtual component as a restricted virtual component in Block S192; in response to identifying the virtual component as a restricted virtual component, identifying a maximum separation distance between an unrestricted surface of the virtual component and a nonadjacent surface blocking the virtual component when the virtual component is traversed along a ray, in the constellation of rays, in a direction in Block S194; virtually traversing the virtual component approximately half the maximum separation distance along the ray to an intermediate position in Block S130; and generating an installation path, for the virtual component, that specifies virtually traversing the virtual component, opposite the direction, to the intermediate position in Block S196. In this variation, the system can accommodate virtual components and/or subassemblies requiring multiple movements for removal (e.g., movement along multiple axes), as shown in FIGS. 6 and 9. In particular, in this variation, the system can: virtually traverse the virtual component a partial distance along a ray, extending in a partially restricted direction, to an intermediate position; and reattempt virtual traversal of the virtual component along each ray in the constellation of rays with the virtual component located in the intermediate position.

In this variation, the system can: identify a first virtual component and a second virtual component within a virtual assembly model; and identify the first virtual component as partially and/or fully restricted along each linear escape direction by the second virtual component. In response to identifying the first virtual component as a restricted virtual component, the system can identify a maximum separation distance between an unrestricted surface of the first virtual component and a nonadjacent surface blocking the first virtual component. More specifically, the system can: identify the separation distance between each unrestricted surface of the first virtual component and the corresponding nonadjacent surface of the other virtual component; and select the maximum separation distance from these separation distances. The system can then: identify the ray corresponding to the maximum separation distance; and virtually traverse the first virtual component a partial distance along the ray to an intermediate position. For example, the system can virtually traverse the first virtual component a partial distance along the ray, such as approximately 25% of the maximum separation distance, approximately 50% of the maximum separation distance, approximately 75% of the maximum separation distance, etc.

The computer system can then implement methods and techniques described above to: virtually traverse the first virtual component, from the intermediate position, along each ray in the constellation of rays; and identify an unrestricted escape direction for the first virtual component, from the intermediate position. The system can then generate an installation path, for the first virtual component, that specifies: virtually traversing the first virtual component, in a first direction, to the intermediate position; and virtually traversing the first virtual component in a second direction different from the first direction (i.e., to the final position). The system can then implement methods and techniques described above to represent installation of the first virtual component, along the installation path, in the virtual assembly sequence. Thus, in this variation, the system can identify a moveable virtual component (i.e., including a free surface, non-mating surface) with a partially unrestricted escape direction and execute a sequence of incremental displacements, without recalculating the list of guards at each iteration, to facilitate removal of the virtual component.

13.1 Variation: Guard Recalculation

In one variation, the system can recalculate the list of guards upon executing a partial movement to identify virtual components obstructing a virtual component with the virtual component in the intermediate position. In particular, in this variation, the system can: identify a first virtual component and a second virtual component within a virtual assembly model; and identify the first virtual component as partially and/or fully restricted along each linear escape direction by the second virtual component.

The system can then: identify a first surface of the first virtual component, partially unrestricted by the second virtual component (i.e., not adjacent the second virtual component); identify a partially unrestricted escape direction for the first virtual component corresponding to a direction in between the first surface and an adjacent surface of the second virtual component; extract a distance, from the list of guards, corresponding to the distance between the first surface and an adjacent surface of the second virtual component; and displace the first virtual component a first distance (e.g., a full and/or partial distance between the first surface and the adjacent surface) along the partially unrestricted escape direction. The system can then: recalculate the list of guards based on the displacement of the first virtual component; and, in response to identifying a second direction as an unrestricted escape direction, remove the first virtual component from the virtual assembly model by displacing the first virtual component along the unrestricted escape direction. Thus, in this variation, the system can identify a moveable virtual component (i.e., including a free surface, non-mating surface) with a partially unrestricted escape direction and execute a sequence of incremental displacements, recalculating the list of guards at each iteration, to facilitate removal of the virtual component.

14. Variation: Non-Linear Ray Casting and Component Collision Detection

In another variation, in response to failing to identify an unrestricted or partially unrestricted escape direction, the system can implement non-linear ray casting to detect component collisions and feasible non-linear escape directions in the virtual assembly model (e.g., circular, helical, ellipsoidal escape directions). In one implementation, the system can implement co-axial rotation (i.e., coaxial rotation with respect to a central axis of a component) for a virtual component in the virtual assembly model requiring non-linear (or "radial") displacement.

In particular, in this implementation, the system can: identify the virtual component including a curved surface; define an origin of the curved surface (e.g., a central axis); define a virtual shell inset from an outer volume of the virtual component; generate a constellation of radial rays tangential to a curved surface of the virtual shell (i.e., the curved surface congruent to the curved surface of the virtual component), each ray defined by a constant radius from the origin and a unique arc length; virtually traverse the virtual shell along each ray in the constellation of rays (i.e., twist the virtual component at unique arc lengths); and record each collision between the virtual shell and another virtual component. In response to the virtual component avoiding collision with another virtual component, in the set of virtual components, along a ray corresponding to a particular arc length, the system can: identify the arc length as an unrestricted escape direction for the virtual component; remove the virtual component from the virtual assembly model by displacing the virtual component along the unrestricted escape direction (i.e., rotating the virtual component to the arc length); and remove the virtual component from the list of guards.

The system can then recurse through the list of guards to remove each virtual component in the virtual assembly model along the corresponding unrestricted escape direction until the virtual assembly model is disassembled (i.e., all components are removed). In response to disassembling the virtual assembly model (i.e., identification of empty guard values in the list of guards), the system can generate and/or store the virtual disassembly sequence representing the sequence of virtual component removal steps, such as a sequence including a set of linear translations and coaxial rotations.

In another implementation, the system can implement non-axial rotation (i.e., non-axial rotation with respect to a central axis of a component) for a virtual component in the virtual assembly model requiring non-linear displacement. In particular, in this implementation, the system can: identify the virtual component including a curved surface; define an origin of the curved surface (e.g., a non-axial point with respect to the central axis); generate a constellation of radial rays emanating from the origin at a unique radius tangential to the curved surface, each ray defined by a unique arc length; define a virtual shell inset from an outer volume of the virtual component; virtually traverse the virtual shell along each ray in the constellation of rays; and record each collision between the virtual shell and another component. The system can then implement methods and techniques described above to remove each virtual component from the virtual assembly model and to derive the virtual disassembly sequence, such as a sequence including a set of non-axial rotations, coaxial rotations, and linear translations.

In another implementation, the system can implement contextual rotation (i.e., rotation with respect to a path defined for a component) for a virtual component in the virtual assembly model requiring non-linear (or "radial") displacement. In particular, in this implementation, the system can: identify the virtual component including a curved surface; identify a path shape congruent with the geometry of the curved surface; define a virtual shell inset from an outer volume of the virtual component; generate a constellation of rays emanating from the virtual component along the path shape; virtually traverse the virtual shell along each ray in the constellation of rays; and record each collision between the virtual shell and another component. For example, the system can: identify a surface with a helical, ellipsoidal, and/or S-shaped surface; and generate a constellation of rays extending along a helical, ellipsoidal, and/or S-shaped path shape, respectively.

In one example, the virtual assembly model includes a set of virtual components including a virtual, S-shaped fastener affixed to an S-shaped bore defined in a virtual object. In this example, for the virtual, S-shaped fastener, the system can: identify an S-shaped surface of the virtual, S-shaped fastener (i.e., a mating surface in contact with an S-shaped surface of the bore); identify an S-shaped path congruent with the geometry of the S-shaped surface of the virtual, S-shaped fastener; define a virtual shell inset from an outer volume of the virtual, S-shaped fastener; and generate a constellation of rays emanating from the virtual, S-shaped fastener along the S-shaped path. Thus, the system can interpret the geometry and configuration of the surfaces of each virtual component within the virtual assembly model to derive feasible escape directions.

As described, the system can implement non-linear ray casting and radial displacement upon failure to disassemble the disassembly via linear translations. Alternatively, the system can implement linear and non-linear ray casting in the initial generation of the list of guards, such that the resulting list of guards includes each virtual component preventing linear translation and each virtual component preventing radial rotation for each virtual component.

15. Multiple Disassembly Sequences

Generally, the system can: generate a set of feasible virtual disassembly sequences derived for a virtual assembly model; and selectively render these feasible virtual disassembly sequences to the user. For example, the system can render a particular virtual disassembly sequence characterized by a relatively high sequence efficiency (e.g., a relatively low quantity of total removal steps, nonlinear disassembly paths, disassembly time, and/or required tool changes). Additionally or alternatively, the system can render a particular virtual disassembly sequence that removes a group of components as a subassembly (i.e., rather than individually). Additionally or alternatively, the system can render a particular virtual disassembly sequence based on a preferred disassembly sequence specified by a user for one or more virtual components within the virtual assembly model.

15.1 Multiple Disassembly Sequences: Sequence Efficiency

In one variation, as shown in FIG. 4, Blocks of the method S100 recite: calculating a first efficiency score for a first virtual disassembly sequence in Block S152; calculating a second efficiency score, less than the first efficiency score, for a second virtual disassembly sequence in Block S152; and, in response to the first efficiency score exceeding the second efficiency score, rendering the first virtual disassembly sequence as a disassembly sequence for the assembly in Block S154. In this variation, the system can calculate an efficiency score for a virtual disassembly sequence, such as based on a quantity of removal steps in the virtual disassembly sequence and/or a removal path type (e.g., linear or nonlinear) for each removal step. In one example, the system can access a virtual assembly model including a first virtual component and a second virtual component.

The system can then implement methods and techniques described above to: derive a first virtual disassembly sequence for the virtual assembly model that specifies removal of the first virtual component by a first displacement distance and removal of the second virtual component by a second displacement distance; and derive a second virtual disassembly sequence for the virtual assembly model that specifies removal of the first virtual component by a third displacement distance, greater than the first displacement distance, and removal of the second virtual component by the second displacement distance. The system can then: calculate a first efficiency score for the first virtual disassembly sequence; calculate a second efficiency score, less than the first efficiency score, for the second virtual disassembly sequence (e.g., based on the inclusion of the greater displacement distance); and, in response to the first efficiency score exceeding the second efficiency score, render the first virtual disassembly sequence (i.e., the least complex sequence).

15.2 Multiple Disassembly Sequences: User Input

In one variation, the system can leverage user-specified preferences to selectively render a virtual disassembly sequence. In particular, in this implementation, the system can prompt the user to input a set of sequence preferences, such as a particular component requiring disassembly prior to another (e.g., based on size, material, cost), and/or a set of virtual components requiring removal in a virtual subassembly (i.e., simultaneous removal), each virtual subassembly requiring removal prior to discrete virtual components. The system can then discard each disassembly sequence failing to comply with the user-specified preferences.

In another variation, the system can prompt the user to input a preferred disassembly sequence for each virtual component within the virtual assembly model (e.g., to enable easy access for routine maintenance to the real assembly). The system can then implement methods and techniques described above to verify feasibility of the user-specified disassembly sequence. Therefore, the system can rapidly generate a set of feasible disassembly sequences for a virtual assembly model and selectively render a particular virtual disassembly sequence based on sequence complexity, manufacturing costs, and/or user preferences.

16. Multiple Assembly Sequences

Generally, the system can: generate a set of feasible virtual assembly sequences for a virtual assembly model; and selectively render these feasible virtual assembly sequences to the user. For example, the system can render a particular assembly sequence characterized by: a relatively high sequence efficiency (e.g., a relatively low quantity of installation steps, nonlinear assembly paths, assembly time, and/or required tool changes); and/or a relatively high sequence stability (e.g., representing the structural integrity and/or stability of the real assembly during the installation process). Additionally or alternatively, the system can isolate a particular assembly sequence that installs a group of components as a subassembly (i.e., rather than individually). Additionally or alternatively, the system can render a particular assembly sequence based on a preferred assembly sequence specified by a user for one or more virtual components within the virtual assembly model.

16.1 Multiple Assembly Sequences: Subassembly

In one variation, as shown in FIG. 3, for a virtual assembly model including a virtual subassembly, the system can render a virtual assembly sequence specifying removal of the virtual subassembly, rather than removal of individual virtual components. In this variation, the system can identify a set of virtual components within a virtual assembly model including: a first virtual component; and a subassembly including a second virtual component and a third virtual component. The system can then implement methods and techniques described above to derive a first virtual assembly sequence for the virtual assembly model that specifies: installation of the first virtual component, onto the virtual assembly model, prior to installation of the second virtual component; installation of the second virtual component, onto the virtual assembly model, following installation of the first virtual component; and installation of the third virtual component, onto the virtual assembly model, following installation of the second virtual component. Additionally, the system can implement methods and techniques described above to derive a second virtual assembly sequence for the virtual assembly model that specifies: assembly of the second virtual component and the third virtual component into the virtual subassembly; installation of the first virtual component, onto the virtual assembly model, prior to installation of the virtual subassembly; and installation of the virtual subassembly onto the virtual assembly model following installation of the first virtual component. The system can then render the second virtual assembly sequence (e.g., via the user interface) based on installation of the virtual subassembly in the second virtual assembly sequence.

In another variation, the system can: receive selection of a virtual subassembly from the user via a user interface; implement methods and techniques described above to verify efficacy of the virtual subassembly (e.g., based on common unrestricted escape directions); and, in response to verifying the virtual subassembly, update the virtual assembly sequence to specify removal of the subassembly (i.e., rather than the individual components).

16.2 Multiple Assembly Sequences: Assembly Stability

Figure 5:
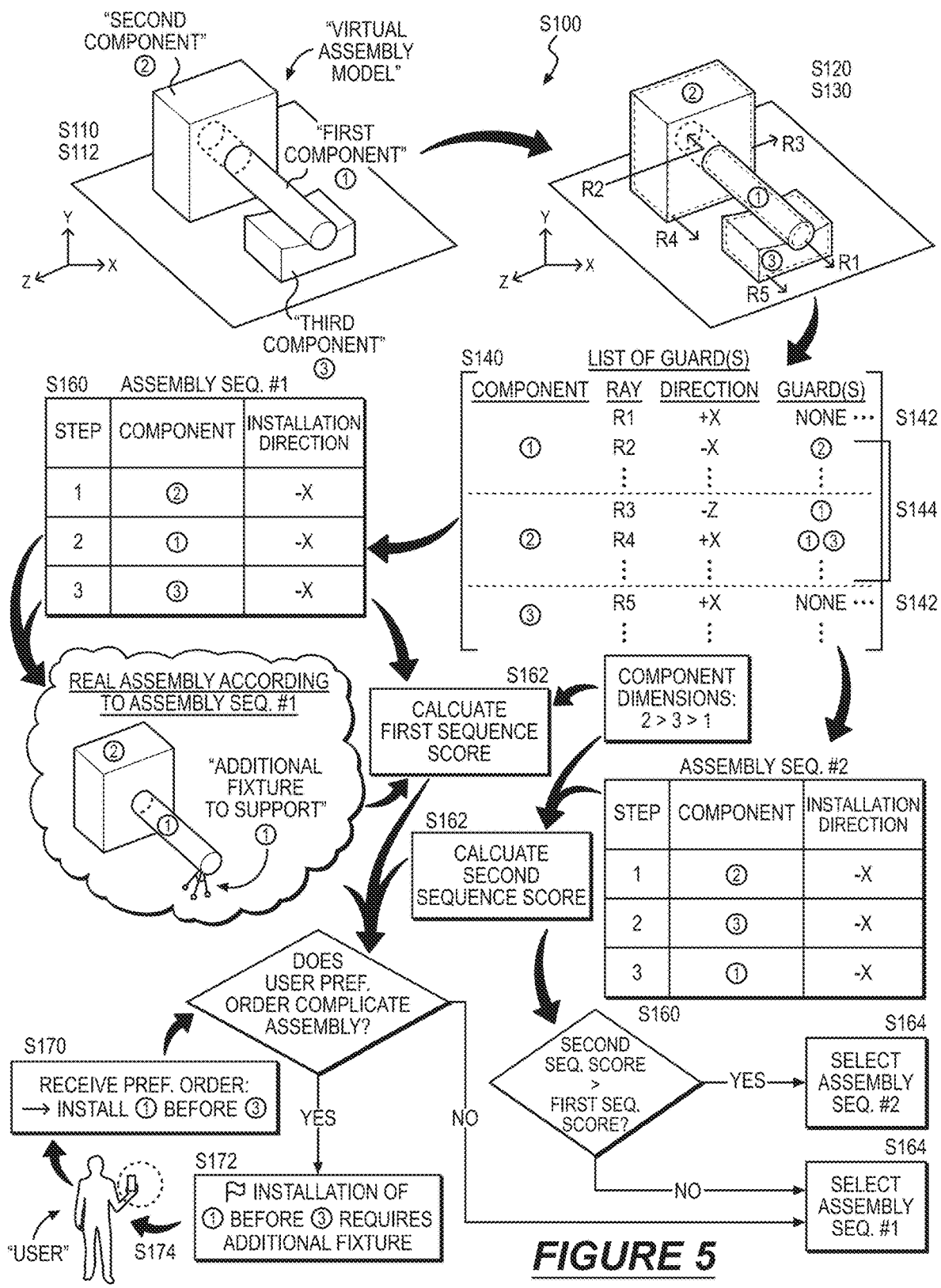
FIG. 5 is a flowchart representation of a variation of the method.

In one variation, as shown in FIG. 5, Blocks of the method S100 recite: calculating a first stability score for a first virtual assembly sequence in Block S162; calculating a second stability score, greater than the first stability score, for a second virtual assembly sequence in Block S162; and, in response to the second stability score exceeding the first stability score, rendering a visual representation depicting the second virtual assembly sequence via the user interface in Block S164. In this variation, the system can: calculate a stability score for each virtual assembly sequence in a set of feasible assembly sequences derived for a virtual assembly model; and render a virtual assembly sequence characterized by the greatest stability score.

In particular, the system can calculate a stability score, for a particular virtual assembly sequence, representing the structural integrity and/or stability of the real assembly during the installation process. More specifically, a particular virtual assembly sequence can be characterized by a relatively low stability score when installation requires temporary fixturing of unsupported components, thus increasing complexity and manufacturing costs associated with the assembly. For example, a virtual assembly sequence specifying installation of an upper component prior to a structurally supporting base component may be characterized by a relatively low stability score.

In this variation, the system can identify a set of virtual components within a virtual assembly model including a first virtual component and a second virtual component structurally supporting (e.g., securing) the first virtual component in an assembled configuration. The system can then implement methods and techniques described above to derive: a first virtual assembly sequence for the virtual assembly model that specifies installation of the second virtual component, onto the virtual assembly model, following installation of the first virtual component; and a second virtual assembly sequence specifying installation of the first virtual component, onto the virtual assembly model, following installation of the second virtual component.

The system can then calculate a stability score for each virtual assembly sequence based on the order of installation of the virtual components and the interactions (e.g., structural dependencies) between the virtual components. In particular, the system can calculate: a first stability score for the first virtual assembly sequence; and a second stability score, greater than the first stability score, for the second virtual assembly sequence. More specifically, the system can calculate a relatively greater second stability score for the second virtual assembly sequence based on installation of the second virtual component (i.e., structurally supporting the first virtual component) prior to installation of the first virtual component. In response to the second stability score exceeding the first stability score, the system can render a visual representation, depicting installation of a set of components forming the assembly according to the second virtual assembly sequence, via the user interface. Alternatively, the system can: render a first visual representation, depicting installation of the set of components forming the assembly according to the first virtual assembly sequence, in a first position via the user interface; and render a second visual representation, depicting installation of the set of components forming the assembly according to the second virtual assembly sequence, in a second position, above the first position, via the user interface. Thus, in this variation, the system can render a virtual assembly sequence that reduces instability and minimizes fixturing requirements during assembly of a real assembly corresponding to the virtual assembly model.

16.3 Multiple Assembly Sequences: Sequence Efficiency

In one variation, as shown in FIG. 5, the system can: calculate an efficiency score for each virtual assembly sequence in a set of feasible assembly sequences derived for a virtual assembly model; and render a virtual assembly sequence for the virtual assembly model characterized by the greatest efficiency score. For example, the system can calculate an efficiency score for a virtual assembly sequence based on: a quantity of installation steps in the virtual assembly sequence; an installation path type (e.g., linear or nonlinear) for each installation step; an installation path length associated with each installation step; and/or a virtual component dimension associated with each installation step.

In one example, the system can calculate an efficiency score based on a virtual component dimension (e.g., volume, surface area) of the virtual component installed at each installation step. In this example, the system can access a virtual assembly model including: a first virtual component exhibiting a first dimension; and a second virtual component exhibiting a second dimension greater than the first dimension. The system can then implement methods and techniques described above to: derive a first virtual assembly sequence for the virtual assembly model that specifies installation of the first virtual component, onto the virtual assembly model, following installation of the second virtual component; and derive a second virtual assembly sequence for the virtual assembly model that specifies installation of the second virtual component, onto the virtual assembly model, following installation of the first virtual component.

The system can then: calculate a first score for the first virtual assembly sequence based on installation of virtual components in ascending order of dimension; calculate a second score, less than the first score, for the second virtual assembly sequence based on installation of virtual components in a non-ascending order of dimension; and, in response to the first score exceeding the second score, render the first virtual assembly sequence as a virtual assembly sequence for the assembly. Thus, in this variation, the system can selectively render a virtual assembly sequence that maximizes installation efficiency, such as by sequencing larger virtual components prior to smaller virtual components to reduce spatial interference and preserve unobstructed access paths required for subsequent installation steps.

16.4 Multiple Assembly Sequences: User Input

In one variation, as shown in FIG. 5, the system can receive user-specified assembly preferences, such as a particular component requiring assembly prior to another (e.g., based on size, material, cost), and/or a set of components requiring installation as a subassembly (e.g., a preassembled subassembly). The system can then discard each virtual assembly sequence failing to comply with the user-specified preferences.

In this variation, the system can identify a set of virtual components within a virtual assembly model including a first virtual component and a second virtual component. The system can then implement methods and techniques described above to derive: a first virtual assembly sequence for the virtual assembly model that specifies installation of the first virtual component, onto the virtual assembly model, prior to installation of the second virtual component; and a second virtual assembly sequence specifying installation of the first virtual component, onto the virtual assembly model, prior to installation of the second virtual component. The system can then: access a user-specified assembly order specifying installation of the first virtual component prior to installation of the second virtual component onto the virtual assembly model; and render a first visual representation, depicting installation of the set of components forming the assembly according to the first virtual assembly sequence, via the user interface.

17. User Alerts

In one variation, as shown in FIG. 5, Blocks of the method S100 recite: receiving a user input specifying installation of a first virtual component prior to installation of a second virtual component onto a virtual assembly model in Block S170; in response to the second virtual component structurally supporting the first virtual component in the assembled configuration, generating a notification including an alert indicating instability during assembly of the virtual assembly model based on installation of the first virtual component prior to installation of the second virtual component in Block S172; and transmitting the notification to a user via the user interface in Block S174. In this variation, the system can generate and transmit an alert to a user in response to receiving a user-specified assembly order that: increases manufacturing costs; increases instability during assembly; and/or decreases assembly efficiency.

In one example, the system can identify a set of virtual components within a virtual assembly model including a first virtual component and a second virtual component structurally supporting (e.g., securing) the first virtual component in an assembled configuration. The system can then implement methods and techniques described above to receive a user input specifying installation of the first virtual component prior to installation of the second virtual component onto the virtual assembly model. The system can then: flag installation of the first virtual component prior to installation of the second virtual component based on the second virtual component structurally supporting the first virtual component in the assembled configuration; generate a notification including an alert indicating instability during assembly of the virtual assembly model resulting from installation of the first virtual component prior to installation of the second virtual component; and transmit the notification to a user via the user interface. Thus, the system can alert the user to prevent selection of an inefficient, expensive, and/or complex virtual assembly sequence resulting from the user-specified assembly order.

In another example, the system can: render a visual representation, depicting installation of a set of components forming the assembly according to the virtual assembly sequence, via a user interface; receive a user input specifying installation of the first virtual component, onto the virtual assembly model, prior to installation of the second virtual component onto the virtual assembly model; flag installation of the first virtual component prior to installation of the second virtual component based on the user-specified sequence generating a non-viable (e.g., unbuildable) assembly sequence; generate an alert indicating a non-viable virtual assembly sequence; and transmit the alert to a user via the user interface.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a virtual assembly model of an assembly, the virtual assembly model including a set of virtual components comprising a first virtual component and a second virtual component;
   for the first virtual component:
   defining a first virtual shell inset from a first surface of the first virtual component;
   generating a first constellation of rays emanating from the first virtual shell;
   virtually traversing the first virtual component along a first ray, in the first constellation of rays, extending in a first direction;
   in response to the first virtual component avoiding collision with another virtual component, in the set of virtual components, when the first virtual component is traversed along the first ray, identifying the first direction as a first unrestricted escape direction for the first virtual component in a list of guards corresponding to the virtual assembly model;
   virtually traversing the first virtual component along a second ray, in the first constellation of rays, extending in a second direction; and
   in response to the first virtual shell avoiding collision with another virtual component, in the set of virtual components, when the first virtual component is traversed along the second ray, identifying the second direction as a second unrestricted escape direction for the first virtual component in the list of guards;
   for the second virtual component:
   defining a second virtual shell inset from a second surface of the second virtual component;
   generating a second constellation of rays emanating from the second virtual shell;

virtually traversing the second virtual component along a third ray, in the second constellation of rays, extending in a third direction; and in response to the second virtual component colliding with the first virtual component when the second virtual component is traversed along the third ray, identifying the third direction as a third restricted escape direction for the second virtual component in the list of guards; and in response to identifying the first unrestricted escape direction for the first virtual component and in response to identifying the first virtual component blocking the second virtual component in the third restricted escape direction:

generating a first virtual disassembly sequence, for the virtual assembly model, that specifies:

removal of the first virtual component, from the virtual assembly model, in the first direction prior to removal of the second virtual component from the virtual assembly model; and removal of the second virtual component, from the virtual assembly model, in the third direction following removal of the first virtual component.

2. The method of claim 1, further comprising generating a first virtual assembly sequence for the virtual assembly model, based on an inverse of the first virtual disassembly sequence, that specifies:

installation of the second virtual component, onto the virtual assembly model, opposite the third direction based on the first virtual component blocking the second virtual component in the third restricted escape direction; and installation of the first virtual component, onto the virtual assembly model, opposite the first direction, following installation of the second virtual component onto the virtual assembly model, based on the first unrestricted escape direction for the first virtual component.

3. The method of claim 1:

wherein generating the first virtual disassembly sequence comprises generating the first virtual disassembly sequence, for the virtual assembly model, that specifies:

removal of the first virtual component, from the virtual assembly model, by a first displacement distance along the first direction to achieve disassembly of the first virtual component from the virtual assembly model; and removal of the second virtual component, from the virtual assembly model, by a second displacement distance along the third direction to achieve disassembly of the second virtual component from the virtual assembly model; and further comprising:

in response to identifying the second unrestricted escape direction for the first virtual component and in response to identifying the first virtual component blocking the second virtual component in the third restricted escape direction:

generating a second virtual disassembly sequence, for the virtual assembly model, that specifies:

removal of the first virtual component, from the virtual assembly model, by a third displacement distance, greater than the first displacement distance, along the second direction to achieve disassembly of the first virtual component from the virtual assembly model; and removal of the second virtual component, from the virtual assembly model, by the second displacement distance along the third direction to achieve disassembly of the second virtual component from the virtual assembly model;

calculating a first efficiency score of the first virtual disassembly sequence;

calculating a second efficiency score, less than the first efficiency score, for the second virtual disassembly; and in response to the first efficiency score exceeding the second efficiency score, rendering a first visual representation, depicting removal of a set of components forming the assembly according to the second virtual disassembly sequence, via a user interface.

4. The method of claim 1:

wherein generating the first constellation of rays for the first virtual component comprises generating the first constellation of rays, each ray in the first constellation of rays comprising a linear ray;

wherein identifying the first direction as the first unrestricted escape direction for the first virtual component in the list of guards comprises:

identifying the first direction as the first unrestricted escape direction for the first virtual component in the list of guards in response to absence of virtual contact between the first virtual shell of the first virtual component and a virtual shell of each virtual component in the virtual assembly model during traversal of the first virtual component in the first direction along the first ray; and, wherein identifying the second direction as the second unrestricted escape direction for the first virtual component in the list of guards comprises:

identifying the second direction as the second unrestricted escape direction for the first virtual component in the list of guards in response to absence of virtual contact between the first virtual shell of the first virtual component and a virtual shell of each virtual component in the virtual assembly model during traversal of the first virtual component in the second direction along the second ray.

5. A method comprising:

accessing a virtual assembly model of an assembly, the virtual assembly model comprising a set of virtual components comprising a first virtual component and a second virtual component;

initializing a list of guards corresponding to the virtual assembly model;

for the first virtual component:

defining a first virtual shell inset from a first surface of the first virtual component;

generating a first constellation of rays emanating from the first virtual shell;

virtually traversing the first virtual component along a first ray, in the first constellation of rays, extending in a first direction;

in response to the first virtual component avoiding collision with another virtual component, in the set of virtual components, when the first virtual component is traversed along the first ray, identifying the first direction as a first unrestricted escape direction for the first virtual component in the list of guards;

virtually traversing the first virtual component along a second ray, in the first constellation of rays, extending in a second direction; and in response to the first virtual shell colliding with another virtual component, in the set of virtual components, when the first virtual component is traversed along the second ray, identifying the second direction as a second restricted escape direction for the first virtual component in the list of guards;

for the second virtual component:
defining a second virtual shell inset from a second surface of the second virtual component;
generating a second constellation of rays emanating from the second virtual shell;
virtually traversing the second virtual component along a third ray, in the second constellation of rays, extending in a third direction;
in response to the second virtual component colliding with the first virtual component when the second virtual component is traversed along the third ray, identifying the third direction as a third restricted escape direction for the second virtual component in the list of guards;
virtually traversing the second virtual component along a fourth ray, in the second constellation of rays, extending in a fourth direction; and
in response to the second virtual shell colliding with another virtual component, in the set of virtual components, when the second virtual component is traversed along the fourth ray, identifying the fourth direction as a fourth restricted escape direction for the second virtual component in the list of guards; and generating a first virtual assembly sequence, for the virtual assembly model, that specifies:
installation of the second virtual component, onto the virtual assembly model, opposite the third direction based on the first virtual component blocking the second virtual component in the third restricted escape direction; and
installation of the first virtual component, onto the virtual assembly model, opposite the first direction, following installation of the second virtual component onto the virtual assembly model based on the first unrestricted escape direction for the first virtual component.

6. The method of claim 5:
further comprising:
in response to identifying the first unrestricted escape direction for the first virtual component and in response to identifying the first virtual component blocking the second virtual component in the third restricted escape direction:
generating a first virtual disassembly sequence, for the virtual assembly model, that specifies:
removal of the first virtual component, from the virtual assembly model, in the first direction prior to removal of the second virtual component from the virtual assembly model based on the first unrestricted escape direction for the first virtual component; and
removal of the second virtual component, from the virtual assembly model, in the third direction following removal of the first virtual component from the virtual assembly model based on the first virtual component blocking the second virtual component in the third restricted escape direction; and
wherein generating the first virtual assembly sequence for the virtual assembly model comprises generating the first virtual assembly sequence for the virtual assembly model based on an inverse of the first virtual disassembly sequence.

7. The method of claim 5:
further comprising:
for a third virtual component in the set of virtual components:
defining a third virtual shell inset from a third surface of the third virtual component;
generating a third constellation of rays emanating from the third virtual shell;
virtually traversing the third virtual component along a fifth ray, in the third constellation of rays, extending in a fifth direction; and
in response to the third virtual component avoiding collision with another virtual component, in the set of virtual components, when the third virtual component is traversed along the fifth ray, identifying the fifth direction as a fifth unrestricted escape direction for the third virtual component in the list of guards;
wherein generating the first virtual assembly sequence for the virtual assembly model comprises generating the first virtual assembly sequence further specifying:
installation of the third virtual component, onto the virtual assembly model, opposite the fifth direction, following installation of the first virtual component onto the virtual assembly model, based on the fifth unrestricted escape direction for the third virtual component; and
further comprising:
generating a second virtual assembly sequence, for the virtual assembly model, that specifies:
installation of the second virtual component, onto the virtual assembly model, opposite the third direction based on the first virtual component blocking the second virtual component in the third restricted escape direction;
installation of the third virtual component, onto the virtual assembly model, opposite the fifth direction, following installation of the second virtual component onto the virtual assembly model, based on the fifth unrestricted escape direction for the third virtual component; and
installation of the first virtual component, onto the virtual assembly model, opposite the first direction, following installation of the third virtual component onto the virtual assembly model, based on the first unrestricted escape direction for the first virtual component;
rendering a first visual representation, depicting installation of a set of components forming the assembly according to the first virtual assembly sequence, via a user interface; and
rendering a second visual representation, depicting installation of the set of components forming the assembly according to the second virtual assembly sequence, via the user interface.

8. The method of claim 7:
wherein accessing the virtual assembly model comprises accessing the virtual assembly model comprising the third virtual component structurally supporting the first virtual component in an assembled configuration;
further comprising:
calculating a first stability score of the first virtual assembly sequence based on installation of the first virtual component prior to installation of the third virtual component onto the virtual assembly model; and calculating a second stability score, greater than the first stability score, for the second virtual assembly sequence based on installation of the third virtual component prior to installation of the first virtual component onto the virtual assembly model; and wherein rendering the second visual representation via the user interface comprises:

in response to the second stability score of the second virtual assembly sequence exceeding the first stability score of the first virtual assembly sequence:

rendering the second visual representation, in a first position above the first visual representation, via the user interface.

9. The method of claim 5:

further comprising:

in response to detecting the first surface of the first virtual component within a predefined threshold distance of the second surface of the second virtual component:

characterizing a first mating type between the first surface and the second surface based on a first geometry of the first surface and a second geometry of the second surface; and retrieving a first set of predefined escape directions, associated with the first mating type, for the first virtual component; and wherein generating the first constellation of rays for the first virtual component comprises:

defining a first origin on the first virtual component; and projecting a first set of rays originating from the first origin, each ray in the first set of rays aligned to a predefined escape direction in the first set of predefined escape directions.

10. The method of claim 9:

further comprising:

in response to detecting a third surface of the second virtual component within the predefined threshold distance of a fourth surface of a fourth virtual component in the set of virtual components:

characterizing a second mating type, different from the first mating type, between the third surface and the fourth surface based on a third geometry of the third surface and a fourth geometry of the fourth surface; and retrieving a second set of predefined escape directions, associated with the second mating type, for the second virtual component based on the second mating type, the second set of predefined escape directions different from the first set of predefined escape directions; and generating a composite set of predefined escape directions based on a union of the first set of predefined escape directions and the second set of predefined escape directions;

wherein generating the first constellation of rays for the first virtual component comprises:

projecting the first set of rays originating from the first origin, each ray in the first set of rays aligned to a predefined escape direction in the composite set of predefined escape directions; and wherein generating the second constellation of rays for the second virtual component comprises:

defining a second origin on the second virtual component; and projecting a second set of rays originating from the second origin, each ray in the second set of rays aligned to a predefined escape direction in the composite set of predefined escape directions.

11. The method of claim 10:

wherein characterizing the first mating type between the first surface and the second surface comprises:

characterizing a concentric mating type between the first surface comprising a first cylindrical surface and the second surface comprising a second cylindrical surface;

wherein retrieving the first set of predefined escape directions comprises retrieving the first set of predefined escape directions, associated with the concentric mating type, comprising:

a first predefined escape direction coaxial with a central axis of the first cylindrical surface; and a second predefined escape direction orthogonal to the first predefined escape direction;

wherein characterizing the second mating type between the third surface and the fourth surface comprises:

characterizing a planar mating type between the third surface comprising a third planar surface and the fourth surface comprising a fourth planar surface;

wherein retrieving the second set of predefined escape directions comprises retrieving the second set of predefined escape directions, associated with the planar mating type, comprising:

a third predefined escape direction orthogonal to the third planar surface; and a fourth predefined escape direction orthogonal to the third predefined escape direction; and wherein generating the composite set of predefined escape directions comprises generating the composite set of predefined escape directions comprising:

the first predefined escape direction;

the second predefined escape direction;

the third predefined escape direction; and the fourth predefined escape direction.

12. The method of claim 5:

wherein accessing the virtual assembly model comprises accessing the virtual assembly model further comprising a third virtual component;

wherein identifying the second direction as the second restricted escape direction for the first virtual component in the list of guards comprises identifying the second direction as the second restricted escape direction for the first virtual component in response to the first virtual shell colliding with the third virtual component when the first virtual component is traversed along the second ray; and further comprising:

rendering a first visual representation, depicting installation of a set of components forming the assembly according to the first virtual assembly sequence, via a user interface;

receiving selection of the first virtual component and the third virtual component as a virtual subassembly from a user via the user interface;

verifying efficacy of the first virtual component and the third virtual component as the virtual subassembly in response to:

the third virtual component blocking the first virtual component in the second restricted escape direction;

the first virtual component blocking the third virtual component in a fifth restricted escape antiparallel to the first unrestricted escape direction; and the second virtual component blocking the first virtual component and the third virtual component in a sixth restricted escape direction; and in response to verifying the virtual subassembly, updating the first virtual assembly sequence to specify:
installation of the second virtual component, onto the virtual assembly model, opposite the third direction based on the first virtual component blocking the second virtual component in the third restricted escape direction;
assembly of the first virtual component and the third virtual component into the virtual subassembly; and
installation of the virtual subassembly, onto the virtual assembly model, opposite the first direction, following installation of the second virtual component onto the virtual assembly model, based on the first unrestricted escape direction for the virtual subassembly.

13. The method of claim 5, further comprising:
rendering a first visual representation, depicting installation of a set of components forming the assembly according to the first virtual assembly sequence, via a user interface;
receiving a user input specifying installation of the first virtual component, onto the virtual assembly model, prior to installation of the second virtual component onto the virtual assembly model;
generating an alert indicating a non-viable virtual assembly sequence based on the first virtual component blocking the second virtual component in the third restricted escape direction; and
transmitting the alert to a user via the user interface.

14. The method of claim 5:
wherein initializing the list of guards corresponding to the virtual assembly model comprises identifying the first direction as the first unrestricted escape direction for the first virtual component in the list of guards, and identifying the second direction as the second restricted escape direction for the first virtual component in the list of guards comprises initializing the list of guards corresponding to the virtual assembly model, identifying the first direction as the first unrestricted escape direction for the first virtual component in the list of guards, and identifying the second direction as the second restricted escape direction for the first virtual component in the list of guards during a first time window at a local computing device; and
wherein generating the first virtual assembly sequence for the virtual assembly model comprises generating the first virtual assembly sequence for the virtual assembly model during a second time window, succeeding the first time window, at the local computing device.

15. The method of claim 5:
wherein identifying the first direction as the first unrestricted escape direction for the first virtual component in the list of guards comprises:
identifying the first direction as the first unrestricted escape direction for the first virtual component in the list of guards in response to absence of virtual contact between the first virtual shell of the first virtual component and a virtual shell of each virtual component in the virtual assembly model during traversal of the first virtual component in the first direction along the first ray; and, wherein identifying the second direction as the second restricted escape direction for the first virtual component in the list of guards comprises:
identifying the second direction as the second restricted escape direction for the first virtual component in the list of guards in response to presence of virtual contact between the first virtual shell of the first virtual component and a virtual shell of another virtual component in the virtual assembly model during traversal of the first virtual component in the second direction along the second ray.

16. The method of claim 5:
wherein defining the first virtual shell for the first virtual component comprises:
identifying the first virtual component as a non-fastener component based on a first geometry of the first virtual component;
in response to identifying the first virtual component as the non-fastener component, assigning a first inset distance to the first virtual shell; and
defining the first virtual shell inset from the first surface of the first virtual component by the first inset distance; and
wherein defining the second virtual shell for the second virtual component comprises:
identifying the second virtual component as a fastener component based on a second geometry of the second virtual component;
in response to identifying the second virtual component as the fastener component, assigning a second inset distance, greater than the first inset distance, to the second virtual shell; and
defining the second virtual shell inset from the second surface of the second virtual component by the second inset distance.

17. The method of claim 5:
further comprising:
for a third virtual component in the set of virtual components:
defining a third virtual shell inset from a third surface of the third virtual component;
generating a third constellation of rays emanating from the third virtual shell;
virtually traversing the third virtual component along each ray in the third constellation of rays;
in response to the third virtual component colliding with another virtual component, in the set of virtual components, when the third virtual component is traversed along each ray, in the third constellation of rays, identifying the third virtual component as a blocked virtual component;
in response to identifying the third virtual component as a restricted virtual component:
identifying a maximum separation distance between an unrestricted surface of the third virtual component and a nonadjacent surface blocking the third virtual component when the third virtual component is traversed along a fifth ray, in the third constellation of rays, in a fifth direction; and
virtually traversing the third virtual component by approximately half the maximum separation distance along the fifth ray to an intermediate position;

virtually traversing the third virtual component, from the intermediate position, along a sixth ray, in the third constellation of rays, extending in a sixth direction; and in response to the third virtual component avoiding collision with another virtual component, in the set of virtual components, when the third virtual component is traversed along the sixth ray from the intermediate position:

identifying the sixth direction as a sixth unrestricted escape direction for the third virtual component; and generating an installation path, for the third virtual component, that specifies:

virtually traversing the third virtual component, opposite the sixth direction, to the intermediate position; and virtually traversing the third virtual component opposite the fifth direction; and wherein generating the first virtual assembly sequence for the virtual assembly model comprises generating the first virtual assembly sequence further specifying:

installation of the third virtual component, onto the virtual assembly model, according to the installation path, following installation of the first virtual component onto the virtual assembly model, based on the first unrestricted escape direction for the third virtual component.

18. The method of claim 5, wherein accessing the virtual assembly model comprises:

accessing an assembly tree corresponding to the virtual assembly model and representing hierarchical relationships of virtual components in the virtual assembly model; and identifying a virtual subassembly, in the set of virtual components and comprising the first virtual component and a third virtual component, defined in the assembly tree.

19. The method of claim 5:

wherein generating the first constellation of rays for the first virtual component comprises generating the first constellation of rays comprising:

the first ray extending in the first direction; and the second ray extending in the second direction antiparallel to the first direction; and wherein generating the second constellation of rays for the second virtual component comprises generating the second constellation of rays comprising:

the third ray extending in the third direction nonparallel to the first direction; and the fourth ray extending in the fourth direction parallel to the first direction.

20. A method comprising:

accessing a virtual assembly model of an assembly;

identifying a set of virtual components within the virtual assembly model, the set of virtual components comprising a virtual component;

for the virtual component:

defining a virtual shell inset from a surface of the virtual component; and generating a constellation of rays emanating from the virtual shell;

virtually traversing the virtual component along a first ray, in the constellation of rays, extending in a first direction;

in response to the virtual component colliding with another virtual component, in the set of virtual components, when the virtual component is traversed along the first ray, identifying the first direction as a restricted escape direction for the virtual component in a list of guards corresponding to the virtual assembly model;

virtually traversing the virtual component along a second ray, in the constellation of rays, extending in a second direction; and in response to the virtual shell avoiding collision with another virtual component, in the set of virtual components, when the virtual component is traversed along the second ray, identifying the second direction as an unrestricted escape direction for the virtual component in the list of guards; and generating a virtual assembly sequence, for the virtual assembly model, that specifies:

installation of the virtual component, onto the virtual assembly model, opposite the second direction, prior to installation of another virtual component, in the set of virtual components, based on the unrestricted escape direction for the virtual component.

* * * * *